US012743288B2

(12) United States Patent

Sandryhaila

(10) Patent No.: US 12,743,288 B2

(45) Date of Patent: Sep. 22, 2026

(54) SYSTEMS AND METHODS FOR AUTOMATED MIGRATION REPLICATION

(71) Applicant: Oracle International Corporation, Redwood Shores, CA (US)

(72) Inventor: Aliaksei Sandryhaila, Seattle, WA (US)

(73) Assignee: ORACLE INTERNATIONAL CORPORATION, Redwood Shore, CA (US)

( * ) Notice: Subject to any disclaimer, the term of this patent is extended or adjusted under 35 U.S.C. 154(b) by 404 days.

(21) Appl. No.: 18/377,160

(22) Filed: Oct. 5, 2023

(65) Prior Publication Data

US 2024/0211295 A1 Jun. 27, 2024

Related U.S. Application Data

(60) Provisional application No. 63/434,879, filed on Dec. 22, 2022, provisional application No. 63/434,846, filed on Dec. 22, 2022.

(51) Int. Cl.
*G06F 16/00* (2019.01)
*G06F 9/445* (2018.01)
(Continued)

(52) U.S. Cl.
CPC ...... *G06F 9/44526* (2013.01); *G06F 9/45558* (2013.01); *G06F 9/4875* (2013.01);
(Continued)

(58) Field of Classification Search
CPC ............ G06F 9/44526; G06F 9/45558; G06F 9/4875; G06F 9/5072; G06F 9/5077;
(Continued)

(56) References Cited

U.S. PATENT DOCUMENTS

| | | | |
|---|---|---|---|
| 7,493,388 | B2 | 2/2009 | Wen et al. |
| 9,778,952 | B1 | 10/2017 | Sutton et al. |

(Continued)

FOREIGN PATENT DOCUMENTS

| | | | |
|---|---|---|---|
| CN | 113485787 | A | 10/2021 |
| CN | 114296649 | A | 4/2022 |

OTHER PUBLICATIONS

Radu, "Azure Stack HubAzure Stack Hub Infrastructure as code using Terraform",2020, Microsoft 365 Community Conference, pp. 1-8 (Year: 2020).*

(Continued)

*Primary Examiner* — Alexander Khong

(74) *Attorney, Agent, or Firm* — Kilpatrick Townsend & Stockton LLP

(57) ABSTRACT

Techniques are provided for automated migration replication. A method can include creating a volume group including an initial snapshot of a virtual machine (VM) residing in an initial environment and in an initial configuration (VM1). The method can include generating a terraform stack based on the initial snapshot, execution of which in an environment causes replication of VM1 in that environment. The method can include providing the terraform stack to a user, generating a subsequent snapshot of the VM in a subsequent configuration (VM2), generating a delta file characterizing the difference between the initial snapshot stored in the volume group and the subsequent snapshot, generating a delta terraform stack based on the delta file, wherein execution of the delta terraform stack causes previously replicated VM1 to update to replicate VM2, and providing the delta terraform stack to the user.

20 Claims, 18 Drawing Sheets

(51) Int. Cl.

| | |
|---|---|
| ***G06F 9/455*** | (2018.01) |
| ***G06F 9/48*** | (2006.01) |
| ***G06F 9/50*** | (2006.01) |
| ***H04L 41/084*** | (2022.01) |

(52) U.S. Cl.
CPC .......... *G06F 9/5072* (2013.01); *G06F 9/5077* (2013.01); *H04L 41/084* (2013.01); *G06F 2009/45583* (2013.01)

(58) Field of Classification Search
CPC ......... G06F 2009/45583; G06F 9/4856; G06F 2009/45562; G06F 2009/4557; H04L 41/084; G06Q 30/0631; G06Q 30/0625
See application file for complete search history.

(56) References Cited

U.S. PATENT DOCUMENTS

| | | | | |
|---|---|---|---|---|
| 10,079,730 | B2 | 9/2018 | Subramanian et al. | |
| 10,469,314 | B2 | 11/2019 | Ennis, Jr. et al. | |
| 10,673,716 | B1 | 6/2020 | Sethuramalingam et al. | |
| 11,301,487 | B1 | 4/2022 | Kumar et al. | |
| 11,412,044 | B1 | 8/2022 | Song et al. | |
| 11,422,838 | B2 * | 8/2022 | Wang | G06F 9/45533 |
| 2009/0094673 | A1 | 4/2009 | Seguin et al. | |
| 2011/0055299 | A1 * | 3/2011 | Phillips | G06F 9/45533 707/827 |
| 2011/0107406 | A1 | 5/2011 | Frost et al. | |
| 2012/0304179 | A1 | 11/2012 | Devarakonda et al. | |
| 2013/0091285 | A1 | 4/2013 | Devarakonda et al. | |
| 2015/0096011 | A1 | 4/2015 | Watt | |
| 2016/0048408 | A1 | 2/2016 | Madhu et al. | |
| 2017/0093640 | A1 | 3/2017 | Subramanian et al. | |
| 2017/0097845 | A1 | 4/2017 | Kouznetsov et al. | |
| 2017/0109190 | A1 | 4/2017 | Sha | |
| 2017/0373933 | A1 | 12/2017 | Subramanian et al. | |
| 2019/0087232 | A1 | 3/2019 | Bergsma et al. | |
| 2019/0266268 | A1 | 8/2019 | Polinati et al. | |
| 2019/0288915 | A1 | 9/2019 | Denyer et al. | |
| 2019/0340003 | A1 | 11/2019 | Ramanathan et al. | |
| 2019/0340100 | A1 | 11/2019 | Patil et al. | |
| 2020/0004582 | A1 | 1/2020 | Fornash et al. | |
| 2020/0019424 | A1 * | 1/2020 | Wang | G06F 9/45558 |
| 2020/0351347 | A1 | 11/2020 | Chang et al. | |
| 2021/0011816 | A1 | 1/2021 | Mitkar et al. | |
| 2021/0365339 | A1 | 11/2021 | Liu et al. | |
| 2022/0021652 | A1 | 1/2022 | Moghe et al. | |
| 2022/0027241 | A1 * | 1/2022 | Shrivastava | G06F 11/1469 |
| 2022/0030064 | A1 | 1/2022 | Dreyband et al. | |
| 2022/0214997 | A1 | 7/2022 | Kavaipatti Anantharamakrishnan et al. | |
| 2022/0327007 | A1 | 10/2022 | Adogla et al. | |
| 2023/0094990 | A1 | 3/2023 | Tammana et al. | |
| 2024/0012720 | A1 * | 1/2024 | Wang | G06F 9/45558 |
| 2024/0070435 | A1 | 2/2024 | Shinde et al. | |

OTHER PUBLICATIONS

Amour, “Azure Stack laaS part one”,2019, Microsoft 365 Community Conference, pp. 1-6 (Year: 2019).*

International Application No. PCT/US2023/085769, “International Preliminary Report on Patentability”, Jul. 3, 2025, 11 pages.

International Application No. PCT/US2023/085769 , “International Search Report and Written Opinion”, May 10, 2024, 14 pages.

“Agentless Migration Architecture”, Available online at: https://learn.microsoft.com/en-us/azure/migrate/concepts-vmware-agentless-migration?view=migrate, Accessed from Internet on Mar. 16, 2026, 11 pages.

“AWS Application Discovery Service Resources”, Amazon Web Services, Available Online at: https://aws.amazon.com/application-discovery/resources/, Accessed from Internet on Aug. 1, 2023, 5 pages.

“AWS Application Discovery Service User Guide”, Available Online at: https://web.archive.org/web/20221005192021/http://docs.aws.amazon.com:80/application-discovery/latest/userguide/appdiscovery-ug.pdf, 2022, 126 pages.

“Uploading Terraform states to Yandex Object Storage”, Available online at: https://yandex.cloud/en/docs/tutorials/infrastructure-management/terraform-state-storage?utm_referrer=about%3Ablank, Mar. 5, 2026, 8 pages.

“VM Migration Process”, Available online at: https://docs.cloud.google.com/migrate/virtual-machines/docs/5.0/discover/lifecycle, Accessed from Internet on Mar. 16, 2026, 7 pages.

“VMware VM Migration to AWS Application Migration Services with Pure Storage Cloud Dedicated”, Available online at: https://support.purestorage.com/csh?topicname=c_vmware_vm_migration_to_aws_application_migration_services_pu.html, Sep. 10, 2024, 2 pages.

U.S. Appl. No. 18/336,544, Final Office Action, Mailed on Feb. 9, 2026, 10 pages.

U.S. Appl. No. 18/336,544, Non-Final Office Action, Mailed on Oct. 2, 2025, 8 pages.

U.S. Appl. No. 18/533,704, Non-Final Office Action, Mailed on Mar. 17, 2026, 20 pages.

Babarinde , “How to Migrate on-Premises Workloads with AWS Application Migration Service”, Available online at: https://aws.amazon.com/blogs/publicsector/how-migrate-on-premises-workloads-aws-application-migration-service/, Jul. 12, 2021, 22 pages.

Madhavapeddy et al., “Unikernels: Library Operating Systems for the Cloud”, Association for Computing Machinery, 2013, pp. 461-472.

International Application No. PCT/US2023/082312 , International Preliminary Report on Patentability, Mailed on Jul. 3, 2025, 12 pages.

International Application No. PCT/US2023/082312 , International Search Report and Written Opinion, Mailed on Mar. 13, 2024, 15 pages.

International Application No. PCT/US2023/085338 , International Preliminary Report on Patentability, Mailed on Jul. 3, 2025, 11 pages.

International Application No. PCT/US2023/085338 , International Search Report and Written Opinion, Mailed on May 27, 2024, 14 pages.

U.S. Appl. No. 18/336,544, Notice of Allowance, Mailed On May 8, 2026, 10 pages.

Mastrianni et al., “IT Autopilot: A Flexible IT Service Management and Delivery Platform for Small and Medium Business”, Institute of Electrical and Electronics Engineers, IBM Systems Journal, vol. 46, No. 3, Dec. 31, 2007, pp. 609-624.

* cited by examiner

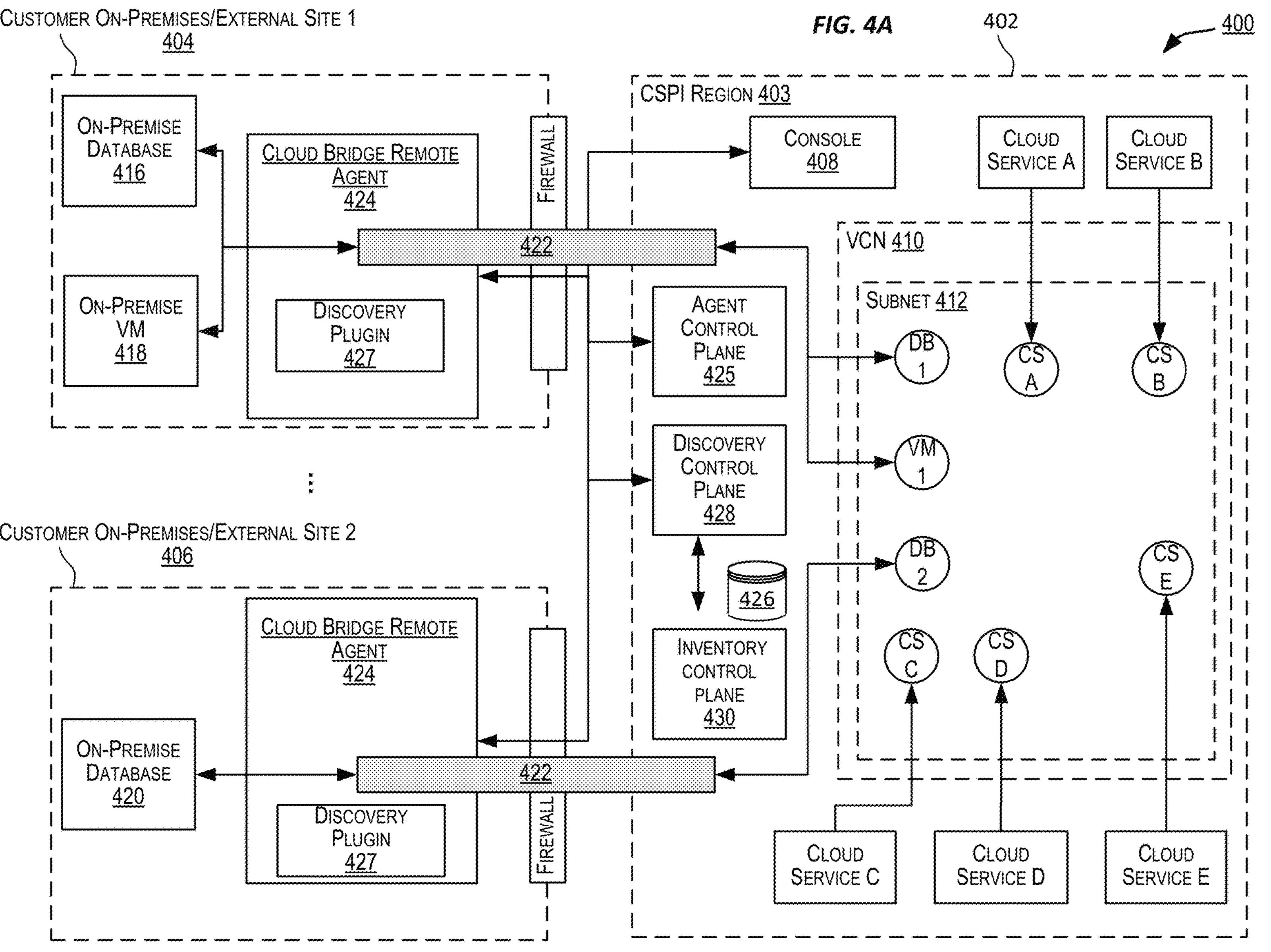
FIG. 4A
400
402
Customer On-Premises/External Site 1
404
On-Premise Database 416
On-Premise VM 418
Cloud Bridge Remote Agent 424
Discovery Plugin 427
Firewall
422
Customer On-Premises/External Site 2
406
On-Premise Database 420
Cloud Bridge Remote Agent 424
Discovery Plugin 427
Firewall
422
CSPI Region 403
Console 408
Cloud Service A
Cloud Service B
VCN 410
Subnet 412
Agent Control Plane 425
Discovery Control Plane 428
426
Inventory Control Plane 430
DB 1
VM 1
DB 2
CS A
CS B
CS C
CS D
CS E
Cloud Service C
Cloud Service D
Cloud Service E

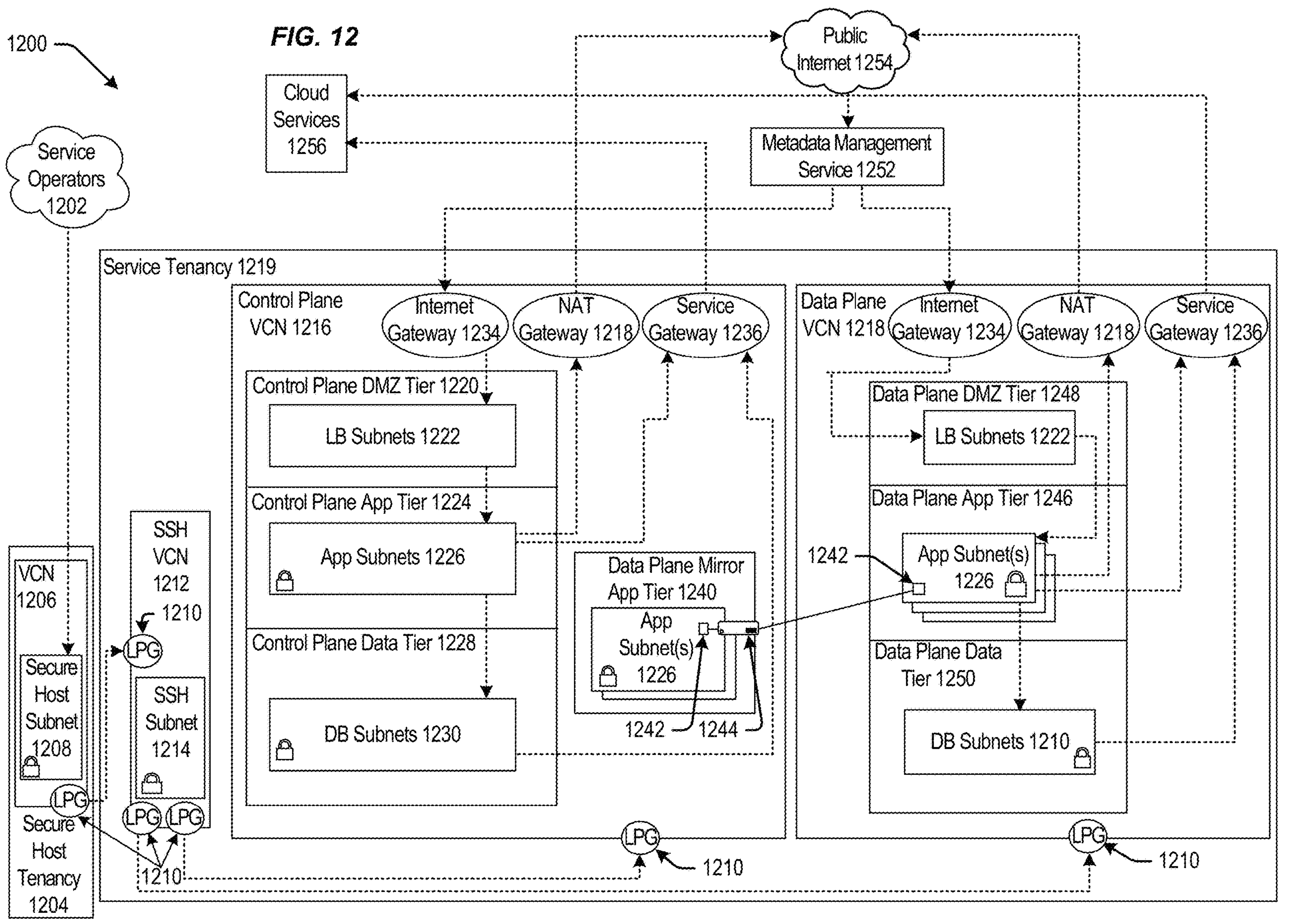
FIG. 12
1200
Service Operators 1202
Cloud Services 1256
Public Internet 1254
Metadata Management Service 1252
Service Tenancy 1219
Control Plane VCN 1216
Internet Gateway 1234
NAT Gateway 1218
Service Gateway 1236
Control Plane DMZ Tier 1220
LB Subnets 1222
Control Plane App Tier 1224
App Subnets 1226
Control Plane Data Tier 1228
DB Subnets 1230
Data Plane Mirror App Tier 1240
App Subnet(s) 1226
1242
1244
Data Plane VCN 1218
Internet Gateway 1234
NAT Gateway 1218
Service Gateway 1236
Data Plane DMZ Tier 1248
LB Subnets 1222
Data Plane App Tier 1246
App Subnet(s) 1226
1242
Data Plane Data Tier 1250
DB Subnets 1210
LPG
1210
SSH VCN 1212
SSH Subnet 1214
VCN 1206
Secure Host Subnet 1208
Secure Host Tenancy 1204

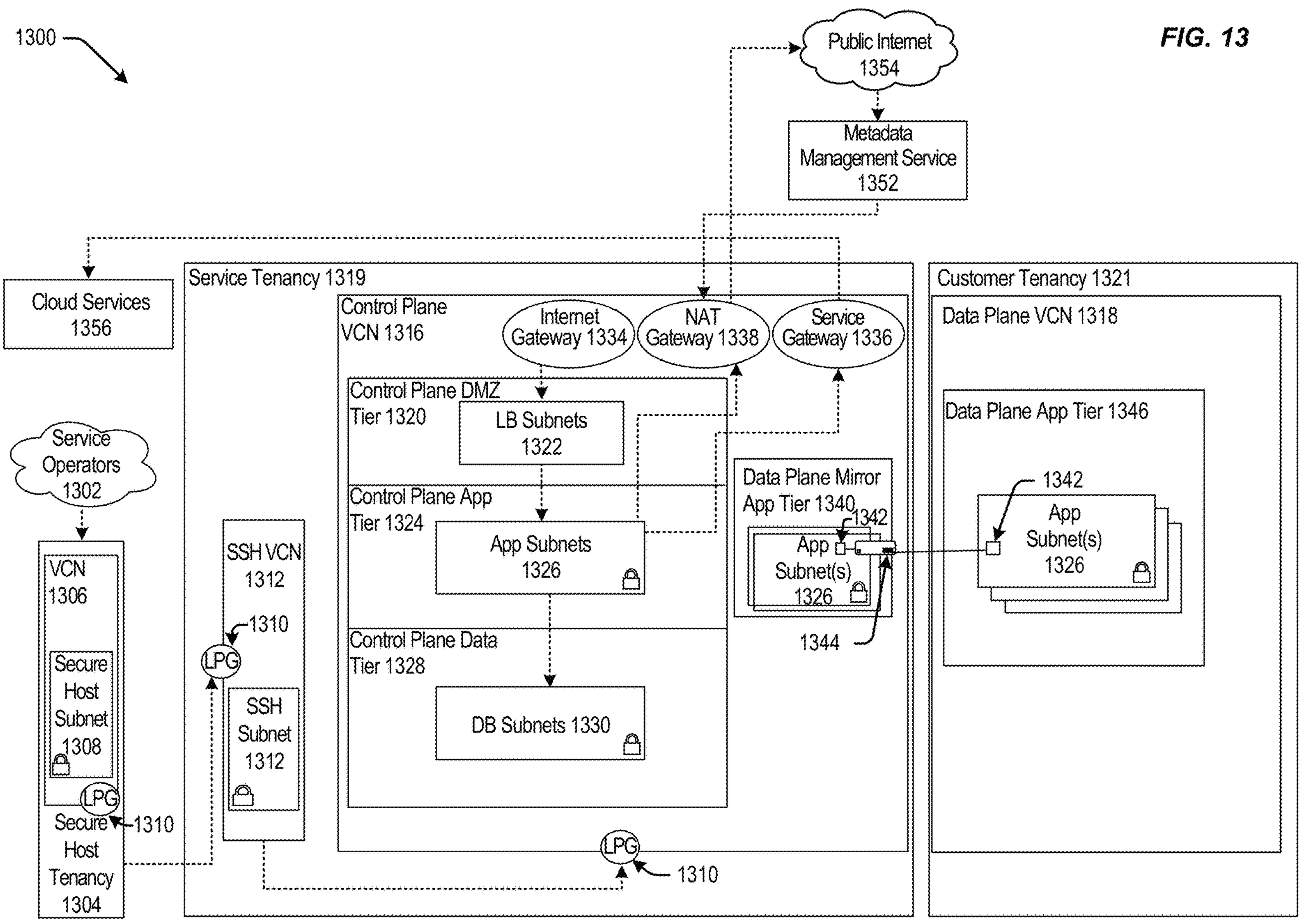
1300
FIG. 13
Public Internet 1354
Metadata Management Service 1352
Cloud Services 1356
Service Tenancy 1319
Customer Tenancy 1321
Control Plane VCN 1316
Internet Gateway 1334
NAT Gateway 1338
Service Gateway 1336
Data Plane VCN 1318
Control Plane DMZ Tier 1320
LB Subnets 1322
Data Plane App Tier 1346
Service Operators 1302
Control Plane App Tier 1324
App Subnets 1326
Data Plane Mirror App Tier 1340
1342
App Subnet(s) 1326
1342
App Subnet(s) 1326
VCN 1306
SSH VCN 1312
1310
LPG
1344
Control Plane Data Tier 1328
Secure Host Subnet 1308
SSH Subnet 1312
DB Subnets 1330
LPG
Secure Host Tenancy 1304
1310
LPG
1310

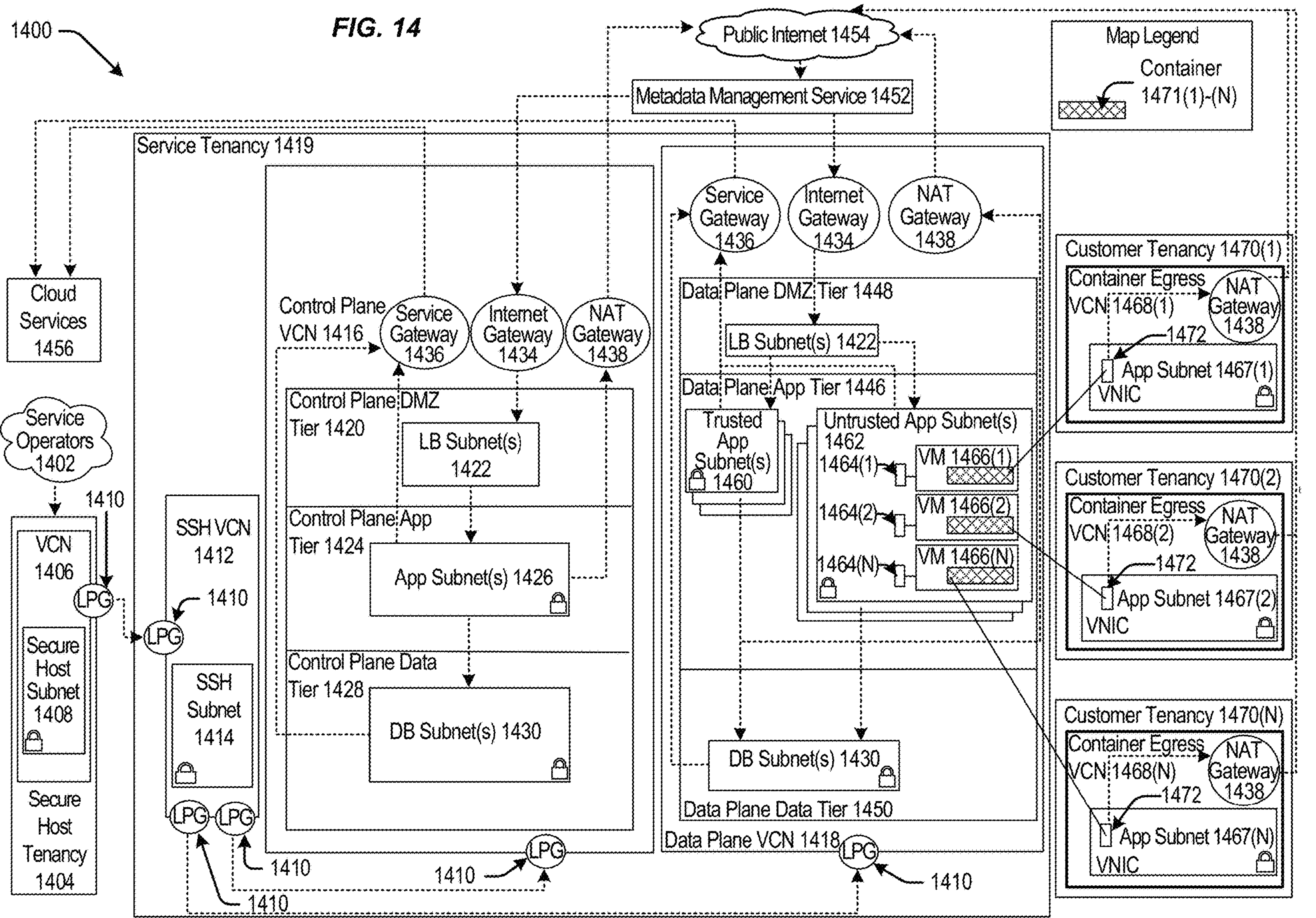

1400
FIG. 14
Public Internet 1454
Metadata Management Service 1452
Map Legend
Container
1471(1)-(N)
Cloud Services 1456
Service Operators 1402
VCN 1406
Secure Host Subnet 1408
Secure Host Tenancy 1404
LPG
1410
Service Tenancy 1419
SSH VCN 1412
SSH Subnet 1414
Control Plane VCN 1416
Service Gateway 1436
Internet Gateway 1434
NAT Gateway 1438
Control Plane DMZ Tier 1420
LB Subnet(s) 1422
Control Plane App Tier 1424
App Subnet(s) 1426
Control Plane Data Tier 1428
DB Subnet(s) 1430
Data Plane DMZ Tier 1448
Data Plane App Tier 1446
Trusted App Subnet(s) 1460
Untrusted App Subnet(s) 1462
1464(1)
1464(2)
1464(N)
VM 1466(1)
VM 1466(2)
VM 1466(N)
Data Plane Data Tier 1450
Data Plane VCN 1418
Customer Tenancy 1470(1)
Container Egress VCN 1468(1)
1472
App Subnet 1467(1)
VNIC
Customer Tenancy 1470(2)
Container Egress VCN 1468(2)
App Subnet 1467(2)
Customer Tenancy 1470(N)
Container Egress VCN 1468(N)
App Subnet 1467(N)

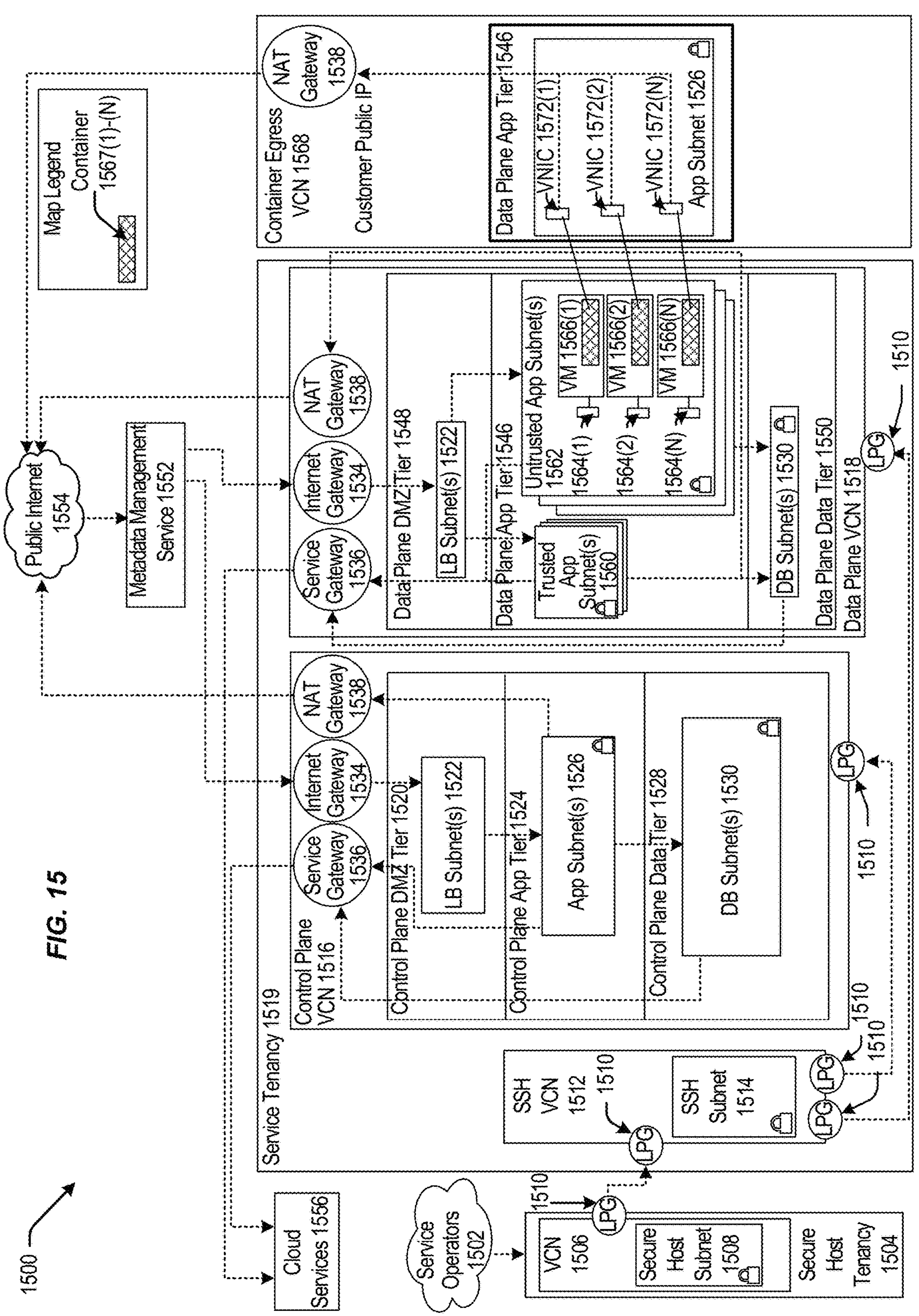

FIG. 15
1500
Public Internet 1554
Map Legend
Container 1567(1)-(N)
Metadata Management Service 1552
Container Egress VCN 1568
NAT Gateway 1538
Customer Public IP
Data Plane App Tier 1546
VNIC 1572(1)
VNIC 1572(2)
VNIC 1572(N)
App Subnet 1526
Service Tenancy 1519
Data Plane VCN 1518
Service Gateway 1536
Internet Gateway 1534
NAT Gateway 1538
Data Plane DMZ Tier 1548
LB Subnet(s) 1522
Data Plane App Tier 1546
Trusted App Subnet(s) 1560
Untrusted App Subnet(s) 1562
1564(1)
1564(2)
1564(N)
VM 1566(1)
VM 1566(2)
VM 1566(N)
DB Subnet(s) 1530
Data Plane Data Tier 1550
LPG
1510
Control Plane VCN 1516
Control Plane DMZ Tier 1520
Control Plane App Tier 1524
App Subnet(s) 1526
Control Plane Data Tier 1528
DB Subnet(s) 1530
SSH VCN 1512
SSH Subnet 1514
Cloud Services 1556
Service Operators 1502
VCN 1506
Secure Host Subnet 1508
Secure Host Tenancy 1504

SYSTEMS AND METHODS FOR AUTOMATED MIGRATION REPLICATION

CROSS-REFERENCE TO RELATED APPLICATIONS

The present application is a non-provisional application of and claims benefit and priority under 35 U.S.C. 119(e) of U.S. Provisional Application No. 63/434,879, filed Dec. 22, 2022, and U.S. Provisional Application No. 63/434,846, filed Dec. 22, 2022, the entire contents of which are incorporated herein by reference for all purposes.

FIELD

The present disclosure relates generally to resource integration with cloud services, and more particularly, to techniques for extending the cloud service's reach into on- or off-premises environments and other cloud platforms to enable migration and multi-cloud use cases.

BACKGROUND

Cloud computing has been a principal of many organizations for years, offering an array of online services such as collaboration, communication, data storage and backup, user relationship management tools, and more; basically, every technological element needed to run a business. There are presently four main types of cloud computing: private cloud, public cloud, hybrid cloud, and multicloud. A private cloud architecture is a cloud environment dedicated to a single user, group or organization which can be on- or off-premises. A public cloud architecture is a cloud environment dedicated to multiple users, group or organizations which can be on- or off-premises. The hybrid cloud architecture uses both a public cloud architecture and a private cloud architecture or on-premises infrastructure. The multicloud architecture is a combination of clouds (private and/or public) spanning multiple vendors. Each of these types of clouds can be configured to provide various cloud computing services including: Infrastructure as a service (IaaS), Platforms as a service (PaaS), Software as a service (SaaS), and Integration platform as a service (iPaaS). IaaS offers standard compute, storage and network resources on a demand-based scale. PaaS offers software development and deployment resources. SaaS offers software distribution to end users. iPaaS is a suite of cloud services enabling users to develop, execute and govern integration flows between disparate applications.

The growth of cloud computing has enabled organizations to use a wide assortment of highly scalable resources and services on demand rather than constructing and maintaining them on- or off-premises. However, in some organizations, the arrival of these diverse resources and services has created information technology (IT) silos as administrators strive to manage and maintain each different cloud resource and/or on- or off-premises resource (non-cloud resources). For example, IT silos can occur when only one group of people (e.g., one department within an organization) can access certain resources. Cloud-based integration (also known as cloud integration) unifies all the different cloud resources and/or on- or off-premises resources to avoid such IT silo instances. Cloud integration is a form of systems integration business delivered as a cloud computing service that addresses data, process, service-oriented architecture (SOA) and application integration. At its most basic level, cloud integration means connecting a wide range of processes, applications, systems, data repositories, and other IT environments (e.g., public clouds, private clouds, on-premises infrastructure, etc.)—either in a hybrid or multicloud deployment—so that they can operate as a single, cohesive IT infrastructure for an organization. Without a cloud integration solution, administrators need to perform each integration task separately and manually—a process that is time-consuming and increases the opportunity for error.

BRIEF SUMMARY

Techniques are provided (e.g., a method, a system, non-transitory computer-readable medium storing code or instructions executable by one or more processors) herein for automated migration replication. One aspect relates to a method. The method can include creating a volume group including an initial snapshot of a virtual machine (VM) residing in an initial environment, the VM in an initial configuration (VM1). In some embodiments, the VM is designated for replication in a cloud services provider infrastructure (CSPI). The method can include generating a terraform stack based on the initial snapshot. In some embodiments, execution of the terraform stack in an environment causes replication of VM1 in that environment. The method can include providing the terraform stack to a user, generating a subsequent snapshot of the VM in a subsequent configuration (VM2), generating a delta file characterizing the difference between the initial snapshot stored in the volume group and the subsequent snapshot, generating a delta terraform stack based on the delta file, wherein execution of the delta terraform stack causes previously replicated VM1 to update to replicate VM2, and providing the delta terraform stack to the user.

In some embodiments, the VM is not located in the CSPI. In some embodiments, the initial environment is an on-premise environment. In some embodiments, the initial environment VM is located in a cloud environment distinct from the CSPI.

In some embodiments, the method includes executing the stack in a user tenancy in the CSPI to replicate VM1. In some embodiments, the method includes executing the delta stack in the user tenancy to replicate VM2. In some embodiments, the subsequent snapshot is generated after replicating VM1.

In some embodiments, the method includes generating additional subsequent snapshots, and generating a corresponding delta file for each of the subsequent snapshots. In some embodiments, the method includes replicating at least a portion of the volume group. In some embodiments, replicating at least a portion of the volume group includes identifying the volume group, and replicating a boot volume from the volume group.

In some embodiments, generating the terraform stack further includes determining compatibility differences between VM1 and the CSPI, and modifying the replicated boot volume such that replicated VM1 is compatible with the CSPI. In some embodiments, modifying the boot volume such that the replicated VM1 is compatible with the CSPI includes: determining a first attribute of the initial environment, determining a second attribute of the CSPI, determining a difference between the first attribute and the second attribute, and modifying the boot volume to compensate for the difference between the first attribute and the second attribute. In some embodiments, the first attribute characterize hardware of the initial environment. In some embodiments, the second attribute characterizes hardware of a user tenancy in the CSPI. In some embodiments, the terraform stack is modifiable by the user before executing the terraform stack.

In some embodiments, the method includes provisioning a replication server from a migration control plane into a user tenancy in the CSPI, wherein the VM is subsequently replicated into the user tenancy. In some embodiments, the initial environment includes a replication plugin. In some embodiments, creating the volume group includes: generating the snapshot of the VM with the replication plugin, and storing the snapshot of the VM in an object storage. In some embodiments, creating the volume group includes the replication server writing a copy of the snapshot of the VM into block storage to create the volume group.

In some embodiments, the delta file can include a single file, which single file characterize a difference between the initial snapshot of the VM and the subsequent snapshot of the VM. In some embodiments, the delta file can include a plurality of files, which plurality of files together characterize a difference between the initial snapshot of the VM and the subsequent snapshot of the VM. In some embodiments, creating the volume group including the initial snapshot of a virtual machine (VM) residing in an initial environment includes: creating a boot volume, creating a data volume associated with the boot volume, and assigning an identifier to each of the boot volume and the data volume, wherein the identifier is included in the terraform stack.

One aspect relates to a system including memory including a volume database, and a processor. The process can create a volume group including an initial snapshot of a virtual machine (VM) residing in an initial environment, the VM in an initial configuration (VM1), which VM is designated for replication in a cloud services provider infrastructure (CSPI). The processor can generate a terraform stack based on the initial snapshot, execution of which terraform stack in an environment causes replication of VM1 in that environment. The processor can provide the terraform stack to a user, generate a subsequent snapshot of the VM in a subsequent configuration (VM2), generate a delta file characterizing the difference between the initial snapshot stored in the volume group and the subsequent snapshot, generate a delta terraform stack based on the delta file, wherein execution of the delta terraform stack causes previously replicated VM1 to update to replicate VM2, and provide the delta terraform stack to the user.

One aspect relates to a non-transitory computer-readable storage medium storing a plurality of instructions executable by one or more processors. The plurality of instructions when executed by the one or more processors cause the one or more processors to create a volume group comprising an initial snapshot of a virtual machine (VM) residing in an initial environment, the VM in an initial configuration (VM1), which VM is designated for replication in a cloud services provider infrastructure (CSPI). The plurality of instructions when executed by the one or more processors further cause the one or more processors to generate a terraform stack based on the initial snapshot, execution of which terraform stack in an environment causes replication of VM1 in that environment, provide the terraform stack to a user, generate a subsequent snapshot of the VM in a subsequent configuration (VM2), generate a delta file characterizing the difference between the initial snapshot stored in the volume group and the subsequent snapshot, generate a delta terraform stack based on the delta file, wherein execution of the delta terraform stack causes previously replicated VM1 to update to replicate VM2, and provide the delta terraform stack to the user.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 4A is a high-level diagram of a distributed environment 400 showing a cloud bridge architecture for the management and configuration of remote resources that interact with cloud services according to various embodiments.

FIG. 12 is a block diagram illustrating one pattern for implementing a cloud infrastructure as a service system, according to at least one embodiment.

FIG. 13 is a block diagram illustrating another pattern for implementing a cloud infrastructure as a service system, according to at least one embodiment.

FIG. 14 is a block diagram illustrating another pattern for implementing a cloud infrastructure as a service system, according to at least one embodiment.

FIG. 15 is a block diagram illustrating another pattern for implementing a cloud infrastructure as a service system, according to at least one embodiment.

DETAILED DESCRIPTION

Figure 1:
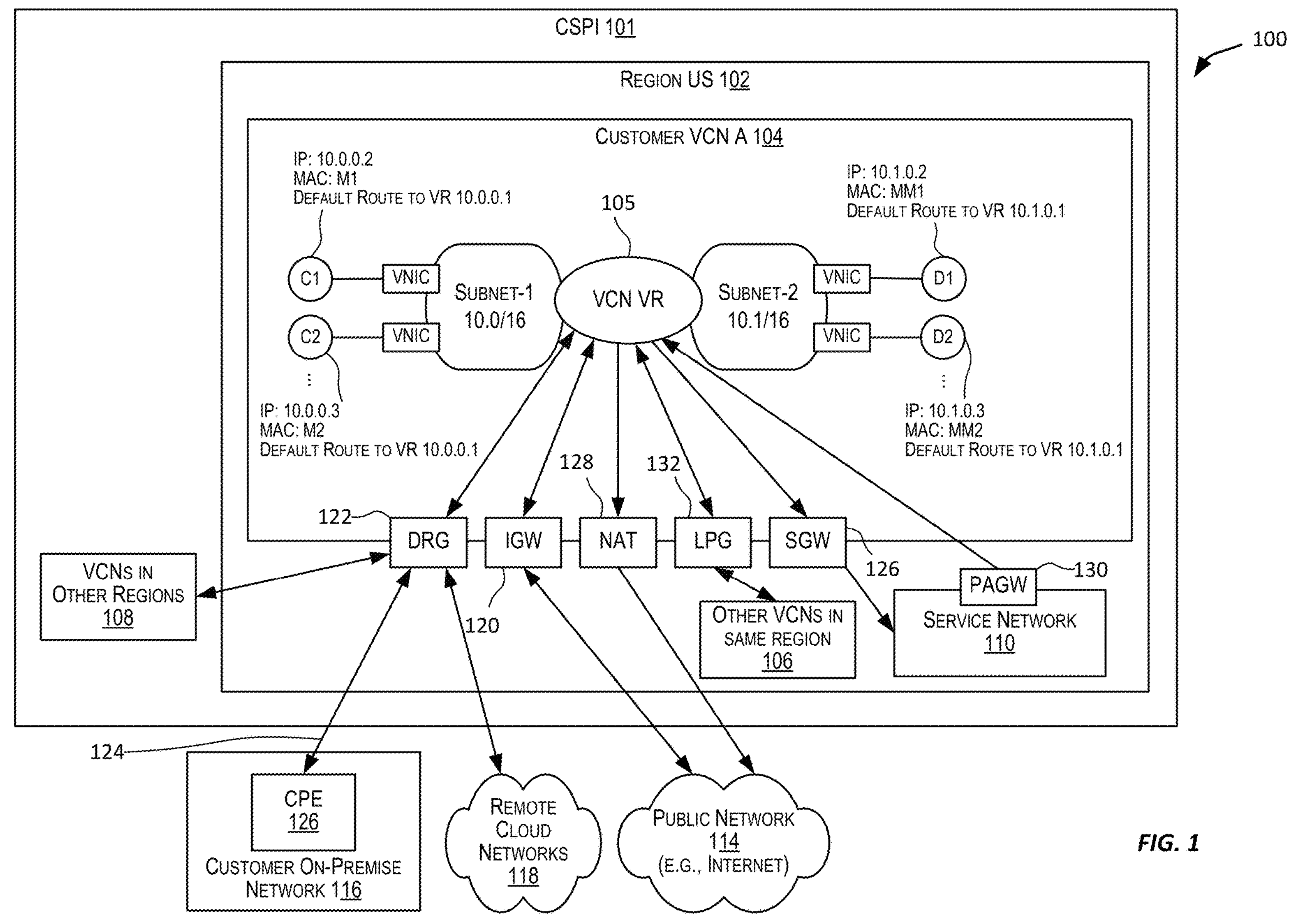
FIG. 1 is a high-level diagram of a distributed environment showing an overlay or user virtual cloud network hosted by cloud service provider infrastructure according to various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Cloud computing is on-demand access, via a network such as the Internet, to computing resources—applications, servers (physical servers and virtual servers), data storage, development tools, networking capabilities, and more—hosted at a remote data center managed by a cloud services provider. A cloud infrastructure such as Oracle Cloud Infrastructure (OCI) is a set of cloud computing services (cloud services) that enable a user to build and run a range of applications and services in a hosted environment. The cloud infrastructure is physically hosted in one or more global regions (i.e., data centers managed by a cloud services provider such as Oracle) and provides high-performance compute capabilities (as physical or virtual hardware instances) and storage capacity in a flexible overlay virtual network that is securely accessible from a user's on-premises network. Cloud services provided by the cloud infrastructure natively integrate with resources maintained in the hosted environment, like databases and compute instances (e.g., physical and/or virtual servers). There is a strong desire to use these cloud services with resources in remote environments either on- or off-premises resources including other cloud resources.

Conventionally, the user experience for remote resource integration with cloud services is complicated. Many services require deployment of service-specific agents and connecting on- or off-premises resources to the cloud either requires one-off, service-specific solutions or the establishment of private site-to-site network connectivity to the cloud infrastructure. For example, Database Management Cloud Service, Oracle Data Safe Service, and the Database Migration Service have conventionally implemented three separate frameworks to integrate with remote databases. Service-specific solutions create barriers to adoption—they fracture a cloud service provider's service portfolio with inconsistent on-premises support and force users to onboard each service independently. Further, every cloud service is burdened with building and maintaining remote-site support. Site-to-site network connectivity provides a more unified experience but has a high barrier to adoption as it requires major changes to remote network infrastructure and forces broad exposure of the user's network to the cloud infrastructure.

The approaches described in the present disclosure provide a simple and secure mechanism to extend the cloud services reach into on- or off-premises environments and other cloud platforms to enable migration and multicloud use cases. This mechanism is executed by a cloud bridge that provides a framework and platform for integrating cloud services' functionalities with external environments or assets (i.e., bridges the gap and connects cloud services with external environments or assets). An exemplary use case is facilitating the native migration of Virtual Machines from a on-premises VMware virtualized environment into a cloud infrastructure (i.e., cloud migration). Another exemplary use case is facilitating the use of Virtual Machines deployed in a cloud infrastructure provided by a first cloud provider with assets stored in a different cloud infrastructure provided by a second cloud provider (i.e., multicloud). The integration is based on a specialized software component (i.e., agent) deployed by a user in an external environment. Each agent is comprised of the agent software residing in the external environment and a corresponding agent control plane residing in the cloud infrastructure.

Nonetheless, users often struggle to understand their legacy environments, including what assets they have, and how the assets interact. For example, for migrating on-premise VMware virtual appliances to OCI native virtual machines, the customer needs to understand what virtual appliances they have and how they interact. Discovery involves learning about a customer environment. For migration use-cases it is needed to discover customer resources that are part of various customers on-premise VMware environments. After discovery, customers need to explore the properties of their on-premise resources to determine what they want to migrate to OCI. As an example, a customer may want to identify their virtual appliances that run Oracle E-Business Suite by filtering the list of all VMware appliances to those that have "ebs" in their names. They may want to then restrict further to those running production workloads by filtering only appliances that have more than four cores.

In order to address these challenges and others, the present disclosure describes a system and workflow for discovery and inventory of components for remote resource integration with cloud services. The discovery and inventory are designed to support thousands of customers each with 10,000s of assets. Migrations are often very complicated, so the goal is to build a flexible framework with various capabilities such as support for different types of external user environments, different types of assets, and different type of asset discovery mechanisms. In summary, the system and workflow involve discovery and inventory to provide a representation of user external environments that support various services such as migration use-cases. Discovery involves discovering resources in a customer environment and creating/updating assets that represent them in the inventory. The discovery is implemented using a discovery control plane on the cloud infrastructure side and a discovery plugin on the side of the external environment. The discovery control plane comprises customer facing application programming interfaces (API), deployed in an overlay, backed by one or more databases, responsible for configuring discovery and coordinating discovery plugins. The discovery plugin is deployed to the customer external environment, responsible for collecting asset metadata and reporting it to the inventory control plane. Inventory involves storing metadata on assets and relationships discovered by the discovery components or imported by customer. The inventory is implemented using an inventory control plane on the cloud infrastructure side. The inventory control plane comprises customer facing API, deployed in the overlay, backed by one or more database based datastores.

In various embodiments, a computer-implemented process is provided that includes deploying a remote agent appliance in an external environment of a user, where the remote agent appliance comprises a discovery plugin; creating an asset source specifying a location of the external environment from which external assets and associated asset metadata should be discovered along with a reference to credentials stored in a data store; creating a discovery policy for discovering the external assets within the asset source; generating a discovery job for the purpose of retrieving the asset metadata for the external assets discovered within the asset source; executing, using the discovery plugin, the discovery job to discover the external assets within the asset source based on the discovery policy, where the executing the discovery job comprises retrieving the asset metadata for the external assets discovered within the asset source and populating an inventory with the asset metadata, and where the inventory contains a collection of assets that includes the asset metadata for the external assets; and providing the collection of assets and the associated asset metadata within the inventory to the user. In some instances, an asset analytic API is also provided to the user to help the user aggregate the asset metadata to gain insight into user's external environment (e.g., on-premises environment).

As used herein, when an action is "based on" something, this means the action is based at least in part on at least a part of the something. As used herein, the terms "similarly", "substantially," "approximately" and "about" are defined as being largely but not necessarily wholly what is specified (and include wholly what is specified) as understood by one of ordinary skill in the art. In any disclosed embodiment, the term "similarly", "substantially," "approximately," or "about" may be substituted with "within [a percentage] of" what is specified, where the percentage includes 0.1, 1, 5, and 10 percent.

Examples of Cloud Networks

The term cloud service is generally used to refer to a service that is made available by a cloud services provider (CSP) to users (e.g., cloud service customers) on demand (e.g., via a subscription model) using systems and infrastructure (cloud infrastructure) provided by the CSP. Typically, the servers and systems that make up the CSP's infrastructure are separate from the user's own on-premise servers and systems. Users can thus avail themselves of cloud services provided by the CSP without having to purchase separate hardware and software resources for the services. Cloud services are designed to provide a subscribing user easy, scalable access to applications and computing resources without the user having to invest in procuring the infrastructure that is used for providing the services.

There are several cloud service providers that offer various types of cloud services. As discussed herein, there are various types or models of cloud services including SaaS, PaaS, IaaS, and others. A user can subscribe to one or more cloud services provided by a CSP. The user can be any entity such as an individual, an organization, an enterprise, and the like. When a user subscribes to or registers for a service provided by a CSP, a tenancy or an account is created for that user. The user can then, via this account, access the subscribed-to one or more cloud resources associated with the account.

As noted above, IaaS is one particular type of cloud computing service. In an IaaS model, the CSP provides infrastructure (referred to as cloud services provider infrastructure or CSPI) that can be used by users to build their own customizable networks and deploy user resources. The user's resources and networks are thus hosted in a distributed environment by infrastructure provided by a CSP. This is different from traditional computing, where the user's resources and networks are hosted by infrastructure provided by the user.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable users to build and run a wide range of applications and services in a highly available hosted distributed environment. CSPI offers high-performance compute resources and capabilities and storage capacity in a flexible virtual network that is securely accessible from various networked locations such as from a user's on-premises network. When a user subscribes to or registers for an IaaS service provided by a CSP, the tenancy created for that user is a secure and isolated partition within the CSPI where the user can create, organize, and administer their cloud resources.

Users can build their own virtual networks using compute, memory, and networking resources provided by CSPI. One or more user resources or workloads, such as compute instances, can be deployed on these virtual networks. For example, a user can use resources provided by CSPI to build one or multiple customizable and private virtual network(s) referred to as virtual cloud networks (VCNs). A user can deploy one or more user resources, such as compute instances, on a user VCN. Compute instances can take the form of virtual machines, bare metal instances, and the like. The CSPI thus provides infrastructure and a set of complementary cloud services that enable users to build and run a wide range of applications and services in a highly available virtual hosted environment. The user does not manage or control the underlying physical resources provided by CSPI but has control over operating systems, storage, and deployed applications; and possibly limited control of select networking components (e.g., firewalls).

The CSP may provide a console that enables users and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single user or tenant. In a multi-tenancy architecture, a software or a hardware component serves multiple users or tenants. Thus, in a multi-tenancy architecture, CSPI resources are shared between multiple users or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. User traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a user's VCN. Two different users or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a VCN, or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, users' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A user's tenancy or account with the CSP exists in a single realm and can be spread across one or more regions that belong to that realm. Typically, when a user subscribes to an IaaS service, a tenancy or account is created for that user in the user-specified region (referred to as the "home" region) within a realm. A user can extend the user's tenancy across one or more other regions within the realm. A user cannot access regions that are not in the realm where the user's tenancy exists.

An IaaS provider can provide multiple realms, each realm catered to a particular set of users or users. For example, a commercial realm may be provided for commercial users. As another example, a realm may be provided for a specific country for users within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a user subscribes to an IaaS service, resources from CSPI are provisioned for the user and associated with the user's tenancy. The user can use these provisioned resources to build private networks and deploy resources on these networks. The user networks that are hosted in the cloud by the CSPI are referred to as VCNs. A user can set up one or more virtual cloud networks (VCNs) using CSPI resources allocated for the user. A VCN is a virtual or software defined private network. The user resources that are deployed in the user's VCN can include compute instances (e.g., virtual machines, bare-metal instances) and other resources. These compute instances may represent various user workloads such as applications, load balancers, databases, and the like. A compute instance deployed on a VCN can communicate with public accessible endpoints ("public endpoints") over a public network such as the Internet, with other instances in the same VCN or other VCNs (e.g., the user's other VCNs, or VCNs not belonging to the user), with the user's on-premise data centers or networks, and with service endpoints, and other types of endpoints.

The CSP may provide various services using the CSPI. In some instances, users of CSPI may themselves act like service providers and provide services using CSPI resources. A service provider may expose a service endpoint, which is characterized by identification information (e.g., an IP Address, a DNS name and port). A user's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Users of the service can then use this service endpoint to access the service. In certain implementations, a service endpoint provided for a service can be accessed by multiple users that intend to consume that service. In other implementations, a dedicated service endpoint may be provided for a user such that only that user can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and Dynamic Host Configuration Protocol (DHCP) options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A user can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The user can choose whether a given rule is stateful or stateless. For instance, the user can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control plane (CP) and the launching of compute instances is handled by a Compute Control plane. The Compute Control plane is responsible for allocating the physical resources for the compute instance and then calls the VCN Control plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane.

A user may create one or more VCNs using resources hosted by CSPI. A compute instance deployed on a user VCN may communicate with different endpoints. These endpoints can include endpoints that are hosted by CSPI and endpoints outside CSPI.

Various different architectures for implementing cloud-based service using CSPI are depicted in FIGS. 1-4C, and are described below. FIG. 1 is a high level diagram of a distributed environment 100 showing an overlay or user VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that users can subscribe to and use to build their VCNs. In certain embodiments, CSPI 101 offers IaaS services to subscribing users. The data centers within CSPI 101 may be organized into one or more regions. One example region "Region US" 102 is shown in FIG. 1. A user has configured a user VCN c/o Oracle International Corporation for region 102. The user may deploy various compute instances on VCN 104, where the compute instances may include virtual machines or bare metal instances. Examples of instances include applications, database, load balancers, and the like.

In the embodiment depicted in FIG. 1, user VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with C1. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 101 and endpoints outside CSPI 101. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the user's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the user's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. As shown in the embodiment depicted in FIG. 1, a Dynamic Routing Gateway (DRG) 122 may be added to or be associated with user VCN 104 and provides a path for private network traffic communication between user VCN 104 and another endpoint, where the another endpoint can be the user's on-premise network 116, a VCN 108 in a different region of CSPI 101, or other remote cloud networks 118 not hosted by CSPI 101. User on-premise network 116 may be a user network or a user data center built using the user's resources. Access to user on-premise network 116 is generally very restricted. For a user that has both a user on-premise network 116 and one or more VCNs 104 deployed or hosted in the cloud by CSPI 101, the user may want their on-premise network 116 and their cloud-based VCN 104 to be able to communicate with each other. This enables a user to build an extended hybrid environment encompassing the user's VCN 104 hosted by CSPI 101 and their on-premises network 116. DRG 122 enables this communication. To enable such communications, a communication channel 124 is set up where one endpoint of the channel is in user on-premise network 116 and the other endpoint is in CSPI 101 and connected to user VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in user on-premise network 116 that forms one endpoint for communication channel 124 is referred to as the user premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a user to peer one VCN with another VCN in a different region. Using such an RPC, user VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for user VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for user's VCN 104 and enables cloud resources in the user's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for user VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by users. For example, a compute instance (e.g., a database system) in a private subnet of user VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The user uses the service CIDR label when they configure the SGW and related route rules to control traffic to the service. The user can optionally utilize it when configuring security rules without needing to adjust them if the service's public IP addresses change in the future.

A Local Peering Gateway (LPG) 132 is a gateway that can be added to user VCN 104 and enables VCN 104 to peer with another VCN in the same region. Peering means that the VCNs communicate using private IP addresses, without the traffic traversing a public network such as the Internet or without routing the traffic through the user's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a user VCN via a public network such as the Internet and or may be privately accessible via SGW 126. According to a specific private access model, services are made accessible as private IP endpoints in a private subnet in the user's VCN. This is referred to as a Private Endpoint (PE) access and enables a service provider to expose their service as an instance in the user's private network. A Private Endpoint resource represents a service within the user's VCN. Each PE manifests as a VNIC (referred to as a PE-VNIC, with one or more private IPs) in a subnet chosen by the user in the user's VCN. A PE thus provides a way to present a service within a private user VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the user tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the user VCN can access the service by sending traffic to the private IP address of the PE in the user VCN. A Private Access Gateway (PAGW) 130 is a gateway resource that can be attached to a service provider VCN (e.g., a VCN in service network 110) that acts as an ingress/egress point for all traffic from/to user subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more users. From the user's perspective, the PE VNIC, which, instead of being attached to a user's instance, appears attached to the service with which the user wishes to interact. The traffic destined to the private endpoint is routed via PAGW 130 to the service. These are referred to as user-to-service private connections (C2S connections).

The PE concept can also be used to extend the private access for the service to user's on-premises networks and data centers, by allowing the traffic to flow through FastConnect/IPsec links and the private endpoint in the user VCN. Private access for the service can also be extended to the user's peered VCNs, by allowing the traffic to flow between LPG 132 and the PE in the user's VCN.

A user can control routing in a VCN at the subnet level, so the user can specify which subnets in the user's VCN, such as VCN 104, use each gateway. A VCN's route tables are used to decide if traffic is allowed out of a VCN through a particular gateway. For example, in a particular instance, a route table for a public subnet within user VCN 104 may send non-local traffic through IGW 120. The route table for a private subnet within the same user VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a user VCN (i.e., by a resource or compute instance deployed on VCN 104) can be categorized as public access, private access, or dedicated access. Public access refers to an access model where a public IP address or a NAT is used to access a public endpoint. Private access enables user workloads in VCN 104 with private IP addresses (e.g., resources in a private subnet) to access services without traversing a public network such as the Internet. In certain embodiments, CSPI 101 enables user VCN workloads with private IP addresses to access the (public service endpoints of) services using a service gateway. A service gateway thus offers a private access model by establishing a virtual link between the user's VCN and the service's public endpoint residing outside the user's private network.

Additionally, CSPI may offer dedicated public access using technologies such as FastConnect public peering where user on-premises instances can access one or more services in a user VCN using a FastConnect connection and without traversing a public network such as the Internet. CSPI also may also offer dedicated private access using FastConnect private peering where user on-premises instances with private IP addresses can access the user's VCN workloads using a FastConnect connection. FastConnect is a network connectivity alternative to using the public Internet to connect a user's on-premise network to CSPI and its services. FastConnect provides an easy, elastic, and economical way to create a dedicated and private connection with higher bandwidth options and a more reliable and consistent networking experience when compared to Internet-based connections.

Figure 2:
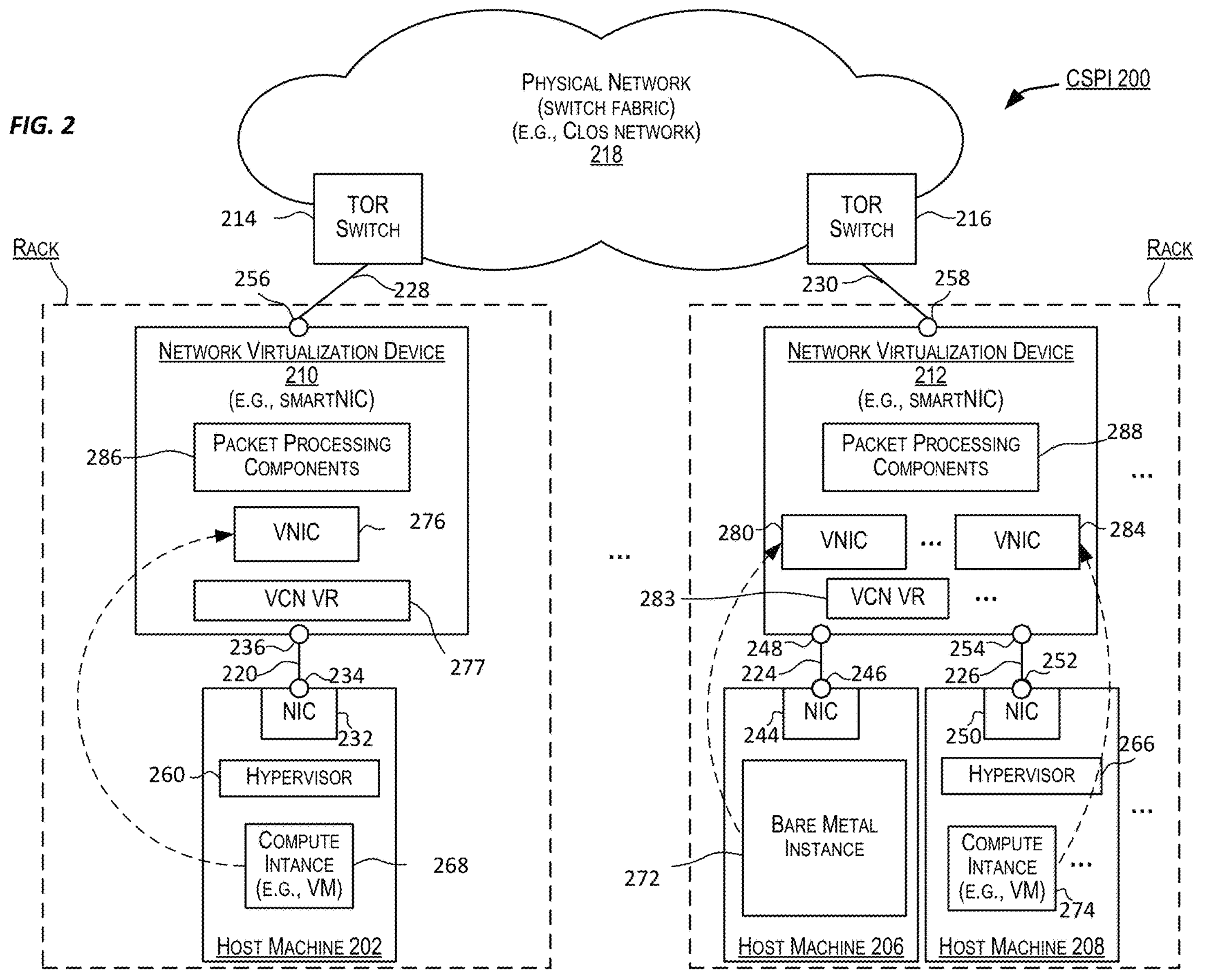
FIG. 2 is a simplified architectural diagram of the physical components in the physical network within a cloud service provider infrastructure that provide the underlay for a virtual network according to various embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a CSP. These components and resources are used to provide cloud services (e.g., IaaS services) to subscribing users, i.e., users that have subscribed to one or more services provided by the CSP. Based upon the services subscribed to by a user, a subset of resources (e.g., compute, memory, and networking resources) of CSPI 200 are provisioned for the user. Users can then build their own cloud-based (i.e., CSPI-hosted) customizable and private virtual networks using physical compute, memory, and networking resources provided by CSPI 200. As previously indicated, these user networks are referred to as VCNs. A user can deploy one or more user resources, such as compute instances, on these user VCNs. Compute instances can be in the form of virtual machines, bare metal instances, and the like. CSPI 200 provides infrastructure and a set of complementary cloud services that enable users to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instance 268 on host machine 202 and compute instance 274 on host machine 208 are examples of virtual machine instances. Host machine 206 is an example of a bare metal instance 272 that is provided to a user.

In certain instances, an entire host machine may be provisioned to a single user, and all of the one or more compute instances (either virtual machines or bare metal instance) hosted by that host machine belong to that same user. In other instances, a host machine may be shared between multiple users (i.e., multiple tenants). In such a multi-tenancy scenario, a host machine may host virtual machine compute instances belonging to different users.

These compute instances may be members of different VCNs of different users. In certain embodiments, a bare metal compute instance is hosted by a bare metal server without a hypervisor. When a bare metal compute instance is provisioned, a single user or tenant maintains control of the physical CPU, memory, and network interfaces of the host machine hosting the bare metal instance and the host machine is not shared with other users or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
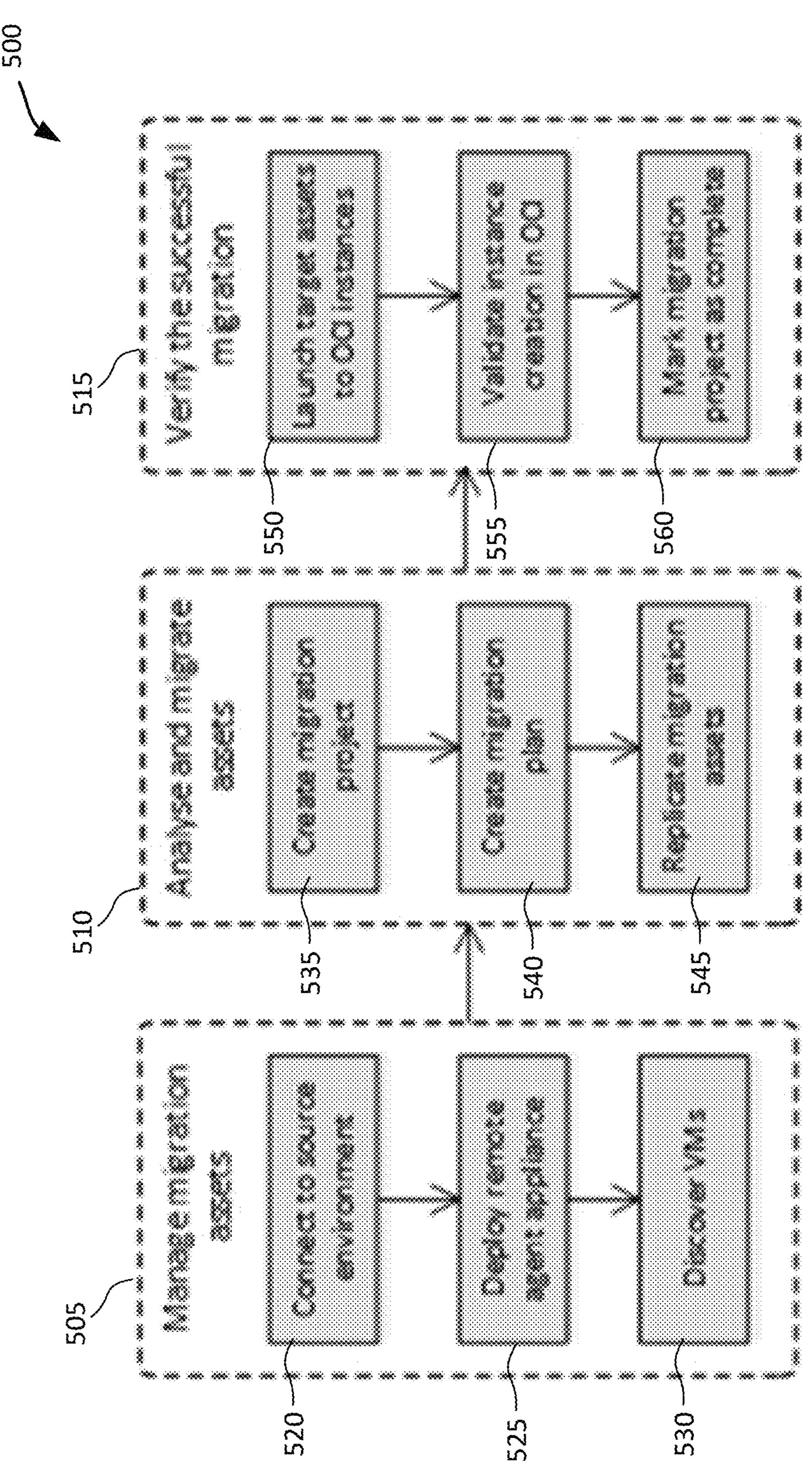
FIG. 5 is a schematic depiction of a cloud migration workflow in accordance with various embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
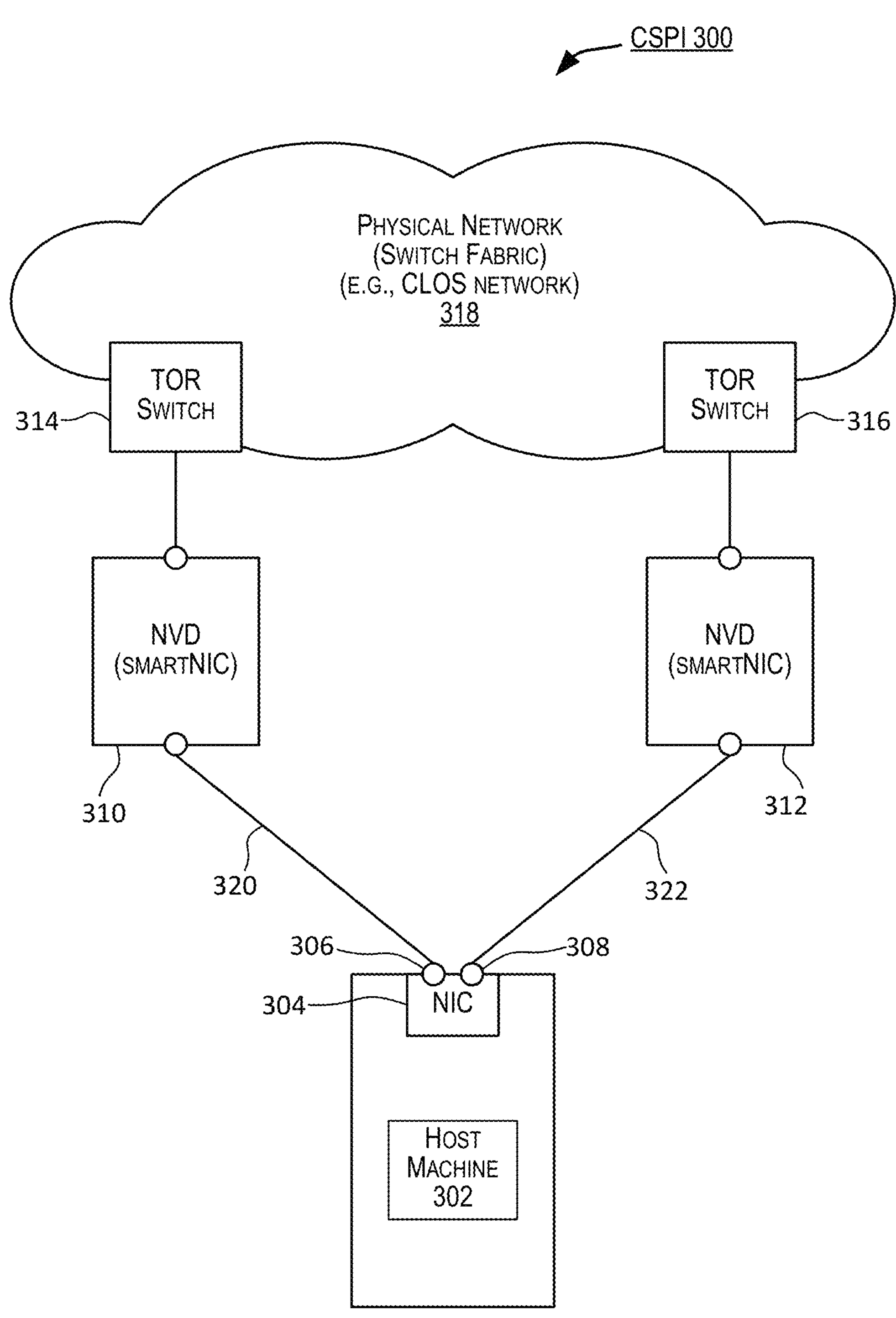
FIG. 3 shows an example within a cloud service provider infrastructure where a host machine is connected to multiple network virtualization devices according to various embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to users, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. The control plane functions include functions used for configuring a network (e.g., setting up routes and route tables, configuring VNICs, etc.) that controls how data is to be forwarded. In certain embodiments, a VCN Control plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the user's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different users, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a user VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination endpoint of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the user's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the user's VCNs, or VCNs not belonging to the user. Communications between endpoints hosted by CSPI 200 may be performed over physical network 218. A compute instance may also communicate with endpoints that are not hosted by CSPI 200, or are outside CSPI 200. Examples of these endpoints include endpoints within a user's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Cloud Bridge and Cloud Migration Service Architectures

A CSPI (e.g., CSPI 101 and 200 described with respect to FIGS. 1 and 2) can be configured to provide a cloud integration service. At least a portion of the cloud integration service is provided using a cloud bridge service (e.g., the Oracle Cloud Bridge (OCB)) for the management and configuration of remote resources that interact with other cloud services provided by the CSPI. The cloud bridge addresses key aspects of this integration including automatic discovery and identity for remote resources, representation of remote resources as assets in the user tenancy, secure network connectivity between remote resources and the CSPI, lifecycle management of agent technology running in remote environments, and assisting with migration of existing user workloads from external environments to the CSPI. The cloud bridge enables users to give remote resources (e.g., databases, compute nodes, etc.) a virtual presence in the CSPI for seamless interaction with other cloud services provided by the CSPI. In order to enable the virtual presence, the cloud bridge provides the remote resources with unique cloud identifiers (CloudIDs, resource principles, etc.) and remote network connectivity for service interaction. This allows for the cloud bridge to be a single location for users to orchestrate and manage CSPI agent functionality on remote resources. For users, the cloud bridge provides a unified, cloud-centric experience across both cloud-native and remote resources with minimal setup in the remote environment. For CSPI service teams, the cloud bridge simplifies environment integration by allowing services to interact with remote resources as they would with cloud resources and by providing a standardized framework for deploying and managing remote agent functionality. This enables CSPI service teams to focus on the core cloud experience without being concerned about remote connectivity or software lifecycle management.

The cloud bridge is managed and configured via a console (e.g., the CSPI console described with respect to FIGS. 1 and 2), application programming interfaces (APIs), and a software development kit (SDK). The management and configuration of the cloud bridge is focused around three basic resource types—environments, agents, and assets. Users create an environment for each location where they desire access to other cloud services provided by the CSPI. The environment serves as a container for assets and defines the scope for managing default policy at that location.

An agent is part of a virtual machine that the user creates from an image provided by the cloud bridge. Agents serve as an extension of the cloud bridge services in the remote environment and are monitored, updated, and operated by the CSPI based on configuration of the associated environment. Agents provide the foundational cloud bridge services, such as remote asset discovery and inventory integration, and include a framework for service-specific plug-ins to execute in the environment. For example, Oracle Cloud Migration service deploys a replication plug-in that creates virtual machine snapshots and uploads them to OCI for migration into OCI compute. The cloud bridge allows users to select from a catalog of agent-based services and automatically deploy the associated functionality into the environments. The cloud bridge will monitor the deployed agents and software versions and provide manually triggered or automated lifecycle management. Multiple agents may exist in the same environment for redundancy and performance reasons.

An asset is a CSPI resource that represents a remote resource discovered by an agent, captures its properties in the remote environment and provides CSPI properties (e.g., CloudID, resource principle, etc.) for use across other cloud services provided by the CSPI. Users can manually add assets or trigger automatic discovery at the environment based on integrations with infrastructure/system management products such as Oracle Enterprise Manager and Microsoft Active Directory. The CSPI applies default access policies based on the asset type. For example, a database asset may default to allow only SSL-encrypted SQLNet connections. Environments and discovered assets can be managed through the asset inventory exposed to the user through the console. A user may choose to perform any action on an asset depending on the asset type and service plugins available for the asset type. For example, virtual machine asset types may support multiple actions: cloud migrate, for example with Oracle Cloud Migrations, as described in detail herein, expose as a VNIC with virtual networking or ship metrics to CSPI with observability. A database asset type may similarly support integration with various database services such as Data Safe and Database Migration services. The cloud bridge may also be integrated with various data management services such as Management Agent Cloud Service (MACS) agents which provide on-guest agent and agent plugin capabilities that gather additional metadata regarding the assets. MACs agents may use the cloud bridge agent framework, so the integration and capabilities are seamless to the user.

FIG. 4A is a high-level diagram of a distributed environment 400 showing a cloud bridge architecture for the management and configuration of remote resources that interact with cloud services according to certain embodiments. As shown in the example depicted in FIG. 4A, distributed environment 400 comprises a cloud infrastructure 402 (CSPI) that is physically hosted in one or more global regions 403 (i.e., data centers managed by a cloud services provider such as Oracle) and provides high-performance compute capabilities (as physical or virtual hardware instances) and storage capacity in a flexible overlay virtual network that is securely accessible from a user's on-premises network (e.g., on-premises network 404 and/or on-premises network 406). The CSPI 402 comprises a console 408 that enables users and network administrators to configure, access, and manage remote resources and resources deployed in the cloud using CSPI resources. In certain embodiments, the console 408 provides a web-based user interface that can be used to access and manage CSPI 402 and various services functionalities including the cloud bridge and migration services. In some implementations, the console 408 is a web-based application provided by the CSP.

A CSP may provide various services using the CSPI 402. In some instances, users of CSPI 402 may themselves act like service providers and provide services using CSPI 402 resources. The service providers may expose a service endpoint, which is characterized by identification information (e.g., an IP Address, a DNS name and port). A user's resource (e.g., a compute instance, on-premises resource, off-premises resource, etc.) can consume a particular service by accessing a service endpoint exposed by the service for that particular service. These service endpoints are generally endpoints that are publicly accessible by users using public IP addresses associated with the endpoints via a public communication network such as the Internet. In certain embodiments, a service provider may expose a service (e.g., Cloud Service A, Cloud Service B, Cloud Service C, Cloud Service D, Cloud Service E) via an endpoint (sometimes referred to as a service endpoint) (e.g., CSA, CSB, CSC, CSD, CSE) for the service. Users of the service can then use this service endpoint to access the service. In certain implementations, a service endpoint provided for a service can be accessed by multiple users that intend to consume that service. In other implementations, a dedicated service endpoint may be provided for a user such that only that user can access the service using that dedicated service endpoint.

CSPI 402 provides services and resources that users can subscribe to and use to build their VCNs. In certain embodiments, CSPI 402 offers IaaS and iPaaS services to subscribing users. In this example, a user has configured a VCN 410 for the global region 403. The user may deploy various compute instances on VCN 410, where the compute instances may include virtual machines or bare metal instances. Examples of instances include applications, database, load balancers, and the like. Multiple compute instances may be deployed on each subnet. In the embodiment depicted in FIG. 4A, the VCN 410 comprises a single subnet 412; however, it should be understood that the VCN 410 could be configured with any number of subnets. The compute instances in a subnet may be hosted by one or more host machines within CSPI 402. A compute instance participates in a subnet via a VNIC associated with the compute instance as described in detail with respect to FIG. 1.

A compute instance deployed on a subnet such as the subnet 412 of the VCN 410 can communicate with various different endpoints. These endpoints may include endpoints that are hosted by CSPI 402 and endpoints outside CSPI 402. Endpoints that are hosted by CSPI 402 may include: an endpoint on the same subnet as the particular compute instance; an endpoint on a different subnet but within the same VCN; an endpoint in a different VCN in the same region; or an endpoint in a VCN in a different region. A compute instance in a subnet hosted by CSPI 402 may also communicate with endpoints that are not hosted by CSPI 402 (i.e., are outside CSPI 402). These outside endpoints include endpoints in the user's on-premises network (e.g., on-premises network 404 and/or on-premises network 406), endpoints within other remote cloud hosted networks, public endpoints accessible via a public network such as the Internet, and other endpoints.

User on-premises network 404 and/or on-premises network 406 may be a user network or a user data center built using the user's resources. Although the user's external resources are all shown on-premises in FIG. 4A, it should be understood that the resources could also be off-premises such as part of a VCN in a CSPI of a different CSP. Access to on-premises network 404 and/or on-premises network 406 is generally very restricted. For a user that has both a user on-premises network 404 and/or on-premises network 406 and one or more VCNs 410 deployed or hosted in the cloud by CSPI 402, the user may want allow cloud services (e.g., cloud services A-E) to interact with a user's external resources (e.g., on-premises database 416, on-premise virtual machine 418, on-premises database 420, etc.). This enables a user to build an extended hybrid or multi-cloud environment encompassing the user's VCN 104 hosted by CSPI 101 and their external resources. The cloud bridge service enables this interaction. To enable such interaction, a communication channel 422 is set up where one endpoint of the channel is in on-premises network 404 and/or on-premises network 406 and the other endpoint is in CSPI 402 and connected to user VCN 410. Communication channel 422 can be over public communication networks such as the Internet or private communication networks. Various communication protocols may be used such as IPsec VPN technology over a public communication network such as the Internet, Oracle's FastConnect technology that uses a private network instead of a public network, and others. The software or virtual machine in user on-premises network 404 and/or on-premises network 406 that forms one endpoint for communication channel 422 is referred to as the agent 424. On the CSPI 402 side, the endpoint (e.g., DB1, DB2, VM1) may be a host machine executing a gateway such as DRG.

The cloud bridge service is comprised of the following three major functionalities: agents, assets discovery, and asset inventory.

Agent functionality enables the cloud services provided by CSPI 402 to interact with a user's external resources (e.g., on-premises database 416, on-premise virtual machine 418, and on-premises database 420). Agent functionality is implemented using agent 424 and its corresponding cloud bridge control plane 425 (also known as the agent or appliance control plane). The agent 424 is a specialized software component used as a platform for deploying cloud service functionalities to interact with external resources. Each agent 424 has a corresponding agent identifier (e.g., a CSPI identifier used to identify the asset as a CSPI 402 resource) and it is associated with an external site identifier (e.g., externalSiteId) for the external environment (e.g., on-premises network 404 and/or on-premises network 406) in which the agent 424 is deployed. The external site identifier is used to identify the external environment in which external resources and agents are deployed. The agent control plane 425 provides management and orchestration across the cloud bridge architecture such as agent registration and agent life cycle management.

Assets discovery functionality enables learning about a user's resources in external environments (e.g., on-premises network 404 and/or on-premises network 406) and creating/updating assets that represent the resources in a cloud bridge inventory 426. Assets are a CSPI 402 resource that represents the metadata of the resources present in the external environments such as vSphere VMs, EC2 instances, databases, etc. Each asset has an asset type defining the different kinds of assets, an asset identifier (e.g., a CSPI identifier used to identify the asset as a CSPI 402 resource), an associated external site identifier, and a source identifier used to identify a discovery plugin that discovered the resource associate with the asset. Assets discovery functionality is implemented using a discovery plugin 427 integrated with agent 425 and its corresponding discovery control plane 428. The discovery plugin 427 is a software component deployed in an external environment and provides functionalities such as asset-discovery, metadata and metrics collection, and reporting of resources and metadata to the inventory 426. The discovery control plane 428 comprises one or more applications deployed in an overlay, backed by a datastore (e.g., an autonomous transaction processing (ATP) datastore), and is responsible for handling asset-discovery-related requests received from a user facing API and the communication and coordination of tasks for discovery plugins 427.

Asset inventory functionality enables storing the metadata on assets and relationships discovered by assets discovery or imported by a user. Asset inventory also exposes a user's facing API for creating, fetching, searching, and analyzing various assets. Asset inventory is implemented using the inventory 426 and its corresponding inventory control plane 430. The inventory 426 is a region specific CSPI 402 resource (e.g., a data table or database) that supports the standard CRUDL operations. The inventory control plane 430 is applications deployed in an overlay, backed by a datastore (e.g., ATP datastore), and is responsible for handling asset-inventory-related requests received from a user facing API and the communication and coordination of tasks for inventory 426 and assets. In certain embodiments, the asset inventory functionality is restricted to a single inventory per region. Advantageously, this helps to de-duplicate the assets in a tenancy. Avoiding duplicate assets helps downstream services such as migration service and replication service, to avoid copying the same VM data multiple times and avoids creating multiple CSPI 402 resources for the same asset. This will also provide one global view of a user's assets across different external environments (e.g., multi-cloud services).

Figure 4B:
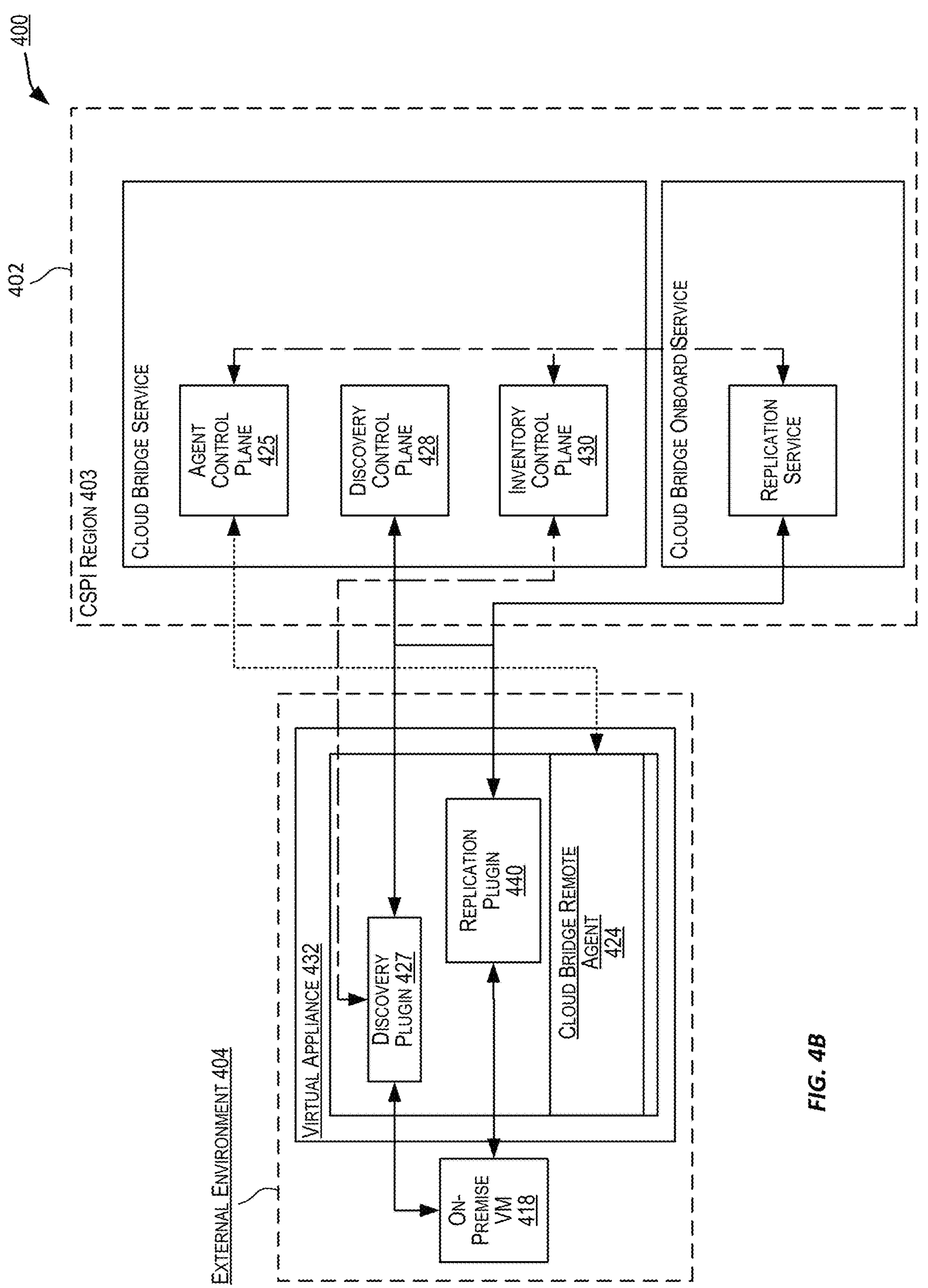
FIGS. 4B and 4C are simplified block diagrams showing an external environment of a user as part of a virtual appliance in accordance with various embodiments.
Figure 4C:
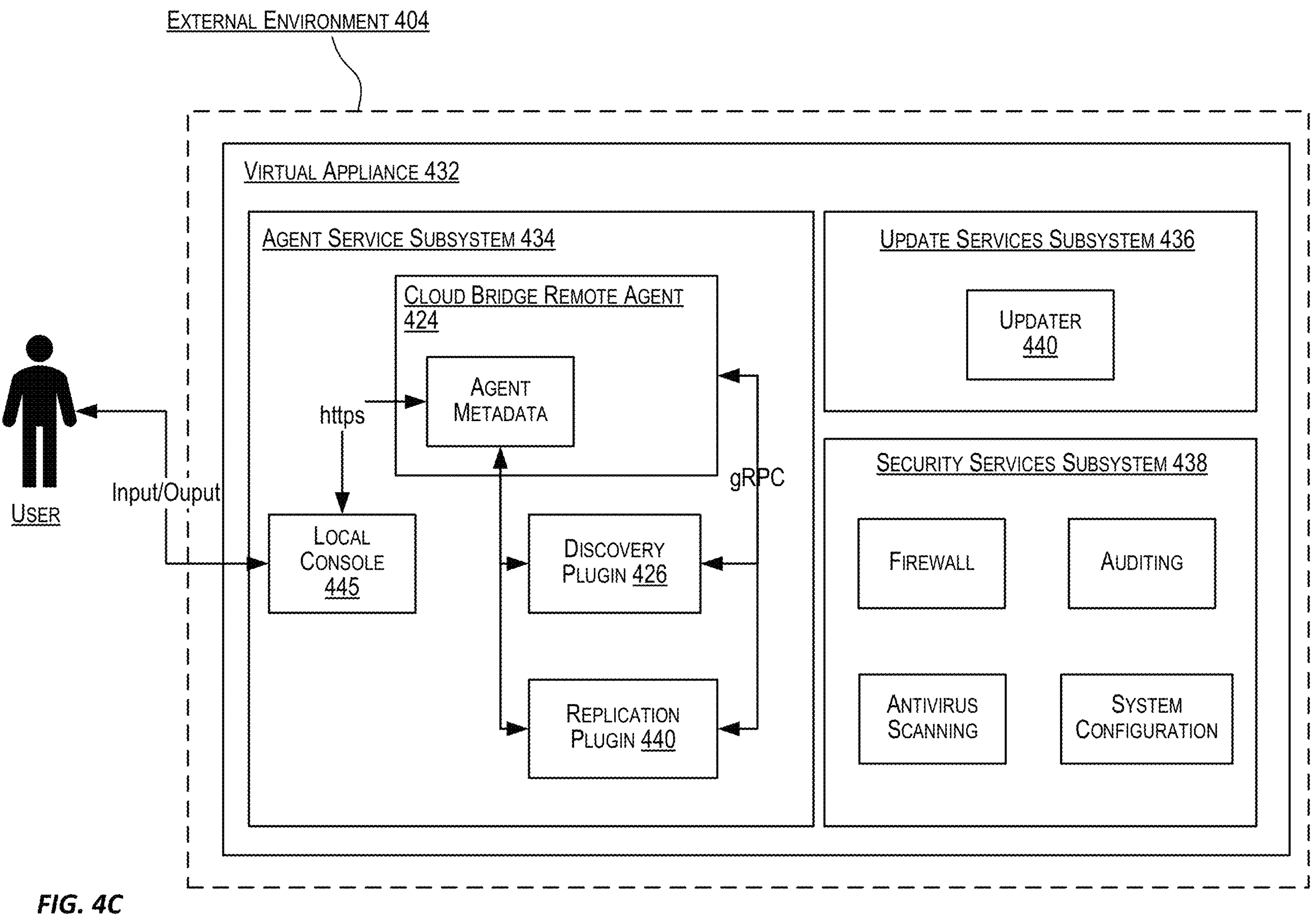

As shown in FIGS. 4B and 4C, the agent 424 is deployed within an external environment of a user (e.g., on-premises network 404 and/or on-premises network 406) as part of a virtual appliance 432. The virtual appliance 432 is a virtual machine pre-configured with the agent software, plugins, and management components. The main components of the virtual appliance 432 are an agent service subsystem 434, an update service subsystem 436, and a security service subsystem 438. The agent service subsystem 434 provides agent core functionality and life cycle management of plugins such as discovery plugin 427 and replication plugin 440. This includes collecting plugin state and reporting back to the agent control plane 425, generating and communicating agent's metrics (e.g., CPU, Memory, etc.) to CSPI monitoring, publishing local logs (e.g., appliance, agent and its plugins) to CSPI logging, and executing the local console application functionality (e.g., local console 445 used for agent registration).

Plugins are self-contained/stand-alone applications that integrate with the agent 424 as part of the virtual appliance 432 that a user creates on external environments from an Open Virtualization Application (OVA) template. The OVA template is a virtual appliance in Open Virtualization Format (OVF) used by virtualization applications such as VMware Workstation and Oracle VM Virtualbox. The OVA template can be used by a user to create multiple virtual machines (e.g., multiple VMs for agent functionality in multiple external environments). In some embodiments, the OVA template is sealed (preventing user remote access) and does not allow a user to execute arbitrary code with the virtual appliance 432. The user may only interact with the OVA template via the local console 445 for registration and all other management operations are orchestrated with the virtual appliance 432 from the CSPI 402. The agent 424 provides environmental/configuration information to plugins (e.g., CSPI 402 region, external site identifier, agent identifier, agent type, etc.) and necessary information for plugins to obtain a resource principal session token(s) to communicate with CSPI 402. The agent 424 also provides monitoring capabilities (metrics and logging) and reports plugin's status back to the agent control plane 425. The agent 424 itself is not publicly reachable from the Internet and the agent 424 and associated plugins initiate connection to CSPI 402 API endpoints (via direct connectivity or corporate proxy).

As described with respect to FIG. 4A, the discovery plugin 427 facilitates learning about a user's resources in external environments (e.g., on-premises network 404 and/or on-premises network 406) and creating/updating assets that represent the resources in a cloud bridge inventory 426. The replication plugin 440 is deployed to the external environment 404, and responsible for replicating data from on-premise VMs to the user's CSPI 402 tenancy (i.e., migration) using an asset replication task. The asset replication task is an atomic unit of work for the replication plugin 440 to import the user's asset into CSPI 402 object storage. This approach lowers the entry bar for migration by not requiring the user to establish on-premises connectivity to CSPI 402 or open ports for communication back to CSPI 402 for every asset source (e.g., vCenter). The replication plugin 440 is published as a binary and then deployed by the CSPI 402 service to corresponding appliances. Although only the discovery plugin 427 and the replication plugin 440 are shown and described herein with respect to virtual appliance 432, it should be understood that other types of plugins may integrate with the agent 424 as part of the virtual appliance 432 to facilitate providing one or more functionalities (e.g., cloud services).

For some functionalities, the agent 424 requires third-party libraries/packages that can't be distributed as part of agent package and require consent and special actions by the user. For example, for cloud migration scope, a Virtual Disk Development Kit (VDDK) is required by the replication plugin 440 to generate snapshots for VMware VM's disks. An agent dependencies process initiated by the user comprises the user downloading a third-party library/package from an associated third-party site, accepting terms of service and uploading the library/package to a preconfigured CSPI 402 object storage bucket. In certain instances, public documentation provided by the CSP provides links and specific instructions to the user on how the downloading/uploading are performed and this may be performed once per dependency version. The user then logs into the console 408, navigates to agent dependencies set-up, creates a new agent dependency for the library/package, which comprises providing the object location in object storage (namespace, bucket, object name, etc.), and selects the type of library/package. This causes the agent control plane 425 to start a dependency signature verification workflow that downloads and calculates a signature (checksum) for the library/package and compares the library/package signature against whitelist signatures in a database to identify and validate the library/package. Once the library/package is identified and validated, the user goes to the console 408, navigates to external sites set-up, and adds the agent dependency identifier to external site identifier. The agent 424 then fetches this information from the agent control plane 425 and locally installs the dependency and makes it available to plugins to consume.

The update service subsystem 436 updates software and parameters of the agent service subsystem 434 and virtual appliance 432. The update service subsystem 436 comprises an updater 440, which is a software component that runs on the virtual appliance 432 and is responsible for keeping the virtual appliance 432 up-to-the-date. Components of the agent 424 are managed by cloud bridge engineers. Release of new code (e.g., new agent security update) results in creation of a new bundle for a given component (e.g., security service subsystem 438) of the agent 424. The updater 440 maintains a list of currently used components, and versions of bundles that each component uses. A bundle is specific realization or instance of the component. A description of the bundle is stored in a database or embeddable key/value store of the agent control plane 425, while the data portion is a BLOB stored in object storage of the agent control plane 425. A BLOB is a binary file containing executables, configuration, and other data needed for the update of the component. The updater 440 is periodically polling the agent control plane 425. When a new bundle is available, the agent control plane 425 replies to the polling with an "update" command, which contains information about the new bundle to install. Upon receiving the update" command, the updater 440 downloads the BLOB, creates a rollback snapshot, prepares a new filesystem (e.g., a subvolume) with the update based on the BLOB, stops the agent 424 processing, and reboots the agent 424 into the new filesystem.

The security service subsystem 438 implements security and compliance controls for the agent service subsystem 434 and virtual appliance 432 using firewalls, antivirus scanning tools, auditing tools, and system configurations.

The following use cases are provided to facilitate an understanding of the cloud bridge architecture; however, it should be understood that these use cases are nonlimiting and other use cases are contemplated and may be implemented by the cloud bridge within a CSPI.

Use Case 1: Private Access to Remote Database for a Database Security Cloud Service.

1. A user uses the console 408 to create an external environment: on-premises network 404.
2. The user downloads an OVA template for virtual appliance 432 and deploys the agent 424 in the on-premises network 404.
3. The user accesses a local console 445 of the agent 424 to register the agent 424 with the cloud bridge.
4. The user initiates a discovery from the console 408 to discover resources including on-premises database 416 in on-premises network 404.
5. The agent 424 collects host, database and database object metadata and creates or updates database assets in inventory 426 using discovery plugin 427, discovery control plane 428, and inventory control plane 430.
6. The user views discovered database assets in the inventory 426 via the console 408, identifies the asset associated with the on-premise database 416, and creates a database private endpoint (DB1) in the VCN 410 to enable private network access to the asset associated with the on-premise database 416, which the user would like to use with a database security cloud service (cloud service A) (e.g., Data Safe).
7. The user creates a private endpoint (CSA) in VCN 410 for database security cloud service (cloud service A) and configures it to protect the asset associated with the on-premise database 416 based on the CloudID or IP address, just as the user would protect a cloud native database in their VCN 410.
8. Optionally, the user configures compute instances in VCN 410 to connect to the on-premise database 416 via the private endpoint (DB1) and communication channel 422.

Use Case 2: Private Access to Remote Virtual Machine Hosting a Data Repository.

1. A user uses the console 408 to create an external environment: on-premises network 404.
2. The user downloads an OVA template for virtual appliance 432 and deploys the agent 424 in the on-premises network 404.
3. The user accesses a local console 445 of the agent 424 to register the agent 424 with the cloud bridge.
4. The user initiates a discovery from the console 408 to discover resources including on-premises virtual machine 418 running a self-hosted Bitbucket Server in on-premises network 404.
5. The agent 424 collects host, database and database object metadata and creates or updates database assets in inventory 426 using discovery plugin 427, discovery control plane 428, and inventory control plane 430.

6. The user views discovered VM assets in the inventory 426 via the console 408, identifies the asset associated with the on-premises virtual machine 418, and creates a VM private endpoint (VM1) in the VCN 410 to enable private network access to the asset associated with the on-premises virtual machine 418, which the user would like to use with a VM cloud service (cloud service B) (e.g., CSPI DevOps service).
7. The user creates a private endpoint (CSB) in VCN 410 for CSPI DevOps service (e.g., a self-hosted Bitbucket Server) and selects the newly created VM private endpoint (VM1) to configure the connection URL and adds the authentication credentials.
8. The user configures the CSPI DevOps "Managed Build stage" to use the private endpoint (CSB) and VM private endpoint (VM1) as part of a DevOps CI/CD pipeline.
9. The user executes the pipeline which can access the data repository from the remote self-hosted Bitbucket Server through the private endpoint (CSB), VM private endpoint (VM1), and communication channel 422.

In some embodiments, the cloud integration service facilitates workload migration from external environments to the CSPI (e.g., CSPI 101 and 200 described with respect to FIGS. 1 and 2) or other environments such as other CSPIs. The workload migration service assists users in all aspects of cloud migration: whether migrating a multi-tier application, a particular datacenter, or a specific class of infrastructure. A cloud migration service (e.g., the Oracle Cloud Migration (OCB)) works with the cloud bridge service (e.g., the Oracle Cloud Bridge (OCB)) for the management and configuration of remote resources that interact with other cloud services provided by the CSPI. The cloud bridge addresses key aspects of this integration including automatic discovery and cloud identity for remote resources, their representation as assets in the user tenancy, secure network connectivity between remote resources and the CSPI, and lifecycle management of agent technology running in the remote environment.

In some embodiments, cloud migration service provides an end-to-end comprehensive self-service experience for migrating existing VMware virtual machine-based workloads from on-premises to the CSPI. The cloud migration service enables a user to identify virtual-machine workloads hosted in an environment external to the CSPI, plan migrations, and automate migration workflows. For example, the following tasks may be provided by the cloud migration service:

- Automatically discover virtual machines external to the CSPI.
- Organize virtual machines for migration.
- Replicate the virtual machine data to the CSPI.
- Plan the redeployment of virtual machines.
- Reconfigure virtual machines to launch successfully as the CSPI compute instances automatically.
- Launch virtual machines as the CSPI compute instances using replicated data.

A successful migration can include the use of a framework to discover and explore the existing assets such as on-premises assets, and then plan migration, replicate data and launch target environments. A top-level container is used as a migration service resource to track all aspects of a migration from discovery through launch. From discovery through migration execution, the cloud migration service will maintain a normalized asset inventory and, regardless of asset type, provide a unified experience to migrate to any appropriate cloud service. For example, a VM instance in cloud migration inventory can be migrated to Virtual Machine Interface (VMI), BareMetal, or VMware on a CSPI. The cloud migration service may provide recommendations and cost estimates to maximize the user benefit, e.g., a CSP may recommend that instead of migrating a database server as a VM, the user should consider migrating their logical databases to DBaaS.

The steps of an exemplary migration are illustrated in FIG. 5. As depicted, an exemplary migration 500 includes managing migration assets 505, analyzing and migrating assets 510, and verifying success of the migration 515. The managing of migration assets 505 includes connecting to a source environment 520, deploying a virtual agent 525, and discovering assets on the source environment 530. A source environment represents an on-premises environment (outside of CSPI), such as an on-premises datacenter within a VMware asset source deployment. To connect an external source environment 520 to CSPI, the user sets up a source environment using the console (a browser-based interface such as console 408 described with respect to FIGS. 4A-4C), the CSPI command line interface (CLI), or a REST API. For example, a user may open the console navigation menu and select a service such as migration services. Under migration services, the user may select remote connections and then select create source environment. The user may then enter a name for the source environment, choose a compartment (provides a global logical namespace where policies can be enforced, as folders in a file system) created on CSPI to be associated with the source environment, and execute creation of the source environment. Once the source environment is created, the user can now download an appropriate remote agent appliance, for example an OVA file, and install the agent appliance, as described in detail with respect to FIGS. 4A-4C. The agent appliance is then registered and verified for use in the source environment. To enable remote agent appliance operations, agent dependencies may be added to the source environment as third-party library dependencies to the agent appliance. For example, the agent dependencies may be added using the VDDK, as described in detail with respect to FIGS. 4A-4C.

The discovery of assets 530 allows for identification and metadata collection for various assets including VMs from the external environment and representation of the assets and relevant metadata in the inventory assets to facilitate the migration process. The discovery of assets 530 is performed using connectors and includes creating an asset source and discovery work request and launching and executing one or more plugins in the on-premises environment including, for example, a discovery plugin to run external asset discovery. The discovery plugin searches for assets in the source environment using environment-specific connectors and APIs. The discovery plugin is described herein as supporting VMware via cloud bridge-based connectors and agents deployed directly on VMs to be migrated. However, it should be understood that other connectors may be built and used to support other assets, clouds, and environments such as Hyper-V or Enterprise Manager. Users may configure a connector for one-shot use or for on-going monitoring to extract run-time metrics for cloud monitoring and track changes to external assets. An external asset will contain metadata and metrics as well as their history and how they were discovered/imported. Metadata history is tracked so that users can monitor an asset's evolution over the course of their long running migration and so cloud migration services can highlight any changes that may require revisiting the migration plan.

The discovered assets are logged and tracked in an inventory subsystem (e.g., a cloud bridge inventory 426 described with respect to FIGS. 4A-4C). The inventory subsystem retrieves metadata information that tracks the assets including virtual machines' physical and runtime properties, such as operating system, hardware, and resource utilization. The inventory subsystem then stores them in a table or database as a collection of assets and associated metadata (i.e., inventory). The inventory subsystem is used to store information about assets discovered in the on-premises environment that can be migrated. These assets are added to the inventory subsystem by using an API and importing a CSV file, or by running automated discovery via the discovery plugin in the external environment.

After external assets are discovered and the required data is collected, analyzing and migrating assets 510 can be executed to create a migration project 535, create one or more migration plans 540, and/or replicate migration assets 545. More specifically, once a user has discovered their external assets, they can create a migration project 535 which groups inter-related and dependent assets for migration. A project is agnostic as to how it is composed: a user may wish to migrate an application or a particular tier of infrastructure. Users will be able to query their inventory for suggested groupings based on observed run-time dependencies or other extracted metadata from the source environment. Migration assets located in the inventory subsystem can then be added to the migration project. The migration project may be used to replicate all the associated migration assets for migration. Migration assets within a project may be configured to reference a replication policy that describes how the asset is to be moved into the CSPI. A replication policy allows for manual or connector-based replication of full-image or incremental asset snapshots either on-demand or on a user-specified schedule. Users are also able to specify if replicated data over-writes or augments previous snapshots to manage storage costs.

From a project a user can manage their grouped inventory assets. For instance, they may set a default replication policy, or refresh external assets from discovery. Within a project, a user creates launch plans 540. A launch plan is a mapping of source assets to target resource types in the CSPI and the context in which to launch them, including compartment, subnets, and launch dependencies. Users may wish to create multiple launch plans for a single migration project for a variety of reasons. They may wish to create an initial launch with minimally sized compute to simply test functionality post migration, later another plan to performance test, and yet another to dial-in right sizing. Each of these may launch in different environments to ensure isolation.

When a user creates a new launch plan, they can direct cloud migration services to pre-populate the selection of target resources with recommendations based on inventory and metrics metadata. For instance, they may want cloud migration services to use minimal sizes, average utilization, or peak utilization to choose target compute shapes. Users will be able to override any target selection, elide an individual asset from launch, or select an existing CSPI instance for cases where migration has already occurred out-of-band. The plan will provide updated costs and other assessments (such as limits implications) of the CSPI deployment as it is edited and highlight any potential compatibility or capacity issues. Users will be able to launch, re-launch (terminate existing and relaunch with latest), and terminate from a launch plan.

The replication of migration assets 545 includes the creating of assets in the CSPI that replicate assets in the external user environment such as, for example, in the on-premises environment. In some embodiments, this replication is performed, in part by a replication plugin that can manage the replication of external assets snapshots. This includes the management of one or several full-image and/or incremental virtual-machine snapshots. Users control replication indirectly by defining replication policies. Each policy corresponds to a migration project and specifies assets to be replicated into the CSPI and the replications frequency. Several workflows inside the migration and replication control plane monitor replication policies, schedule replication tasks according to existing replication policies, and monitor the progress of each replication. At each replication execution, a snapshot of the asset is taken and imported into the CSPI. Users enable the replication plugin on their cloud bridge appliances by providing required credentials and metadata via the cloud bridge appliance setup. The installation process is handled by the cloud bridge appliance. After the replication plugin is enabled, it registers with the replication service and begins polling for replication tasks, using the replication service API.

A migration can be a long-running process and can include one or several iterations of test launches with various configurations. In some embodiments, these iterations can include the continuous refreshing of source data from a source environment before a final migration and the activation of the migrated systems within the CSPI. For example, in an embodiment in which a user is migrating information from a source environment into a CSPI, and specifically into the user's tenancy in the CSPI, the user may repeatedly discover and/or capture on-premises assets and a migration plan can be generated some or all of the times that on-premises assets are discovered. For example, in embodiments in which the user changes one or several on-premises assets, these changes can be captured and/or discovered by repeated iteration of the discovery of those assets. In such an embodiment, a migration can be planned that can capture each of these versions of the user assets. In some embodiments, only the final version of the assets is migrated, and in some embodiments, the user can have control over which version of the assets are replicated in the CSPI.

In some embodiments, the planning of a migration includes evaluation of the capabilities of the CSPI as compared to the capabilities of the on-premises environment and/or on-premises assets. This evaluation includes the determination of whether and to what extent on-premises capabilities differ and/or exceed CSPI capabilities. Based on this determination, the plan for the migration of assets can be modified.

Specifically, for example, during the planning step, the capabilities of user on-premises VMs are identified, and one or several VM configurations (recommendations) within OCI are presented. This includes identifying attributes of each on-premises VM including, hardware, capabilities, and metrics of actual use. The attributes can include, number of CPUs, average CPU usage, max CPU usage, memory, average memory usage, max memory usage, number of VNICs, number of GPU, and/or network bandwidth.

Based on this information, a number of proposed OCI VM shapes are presented. These VM shapes can be generated and presented based in part on information relating to the user, such as user preference for optimum pricing or optimum performance.

The attributes of the on-premise VMs are compared to identified attributes of the OCI VM shapes, and a difference score is generated characterizing the difference between the attributes OCI VM shapes and the attributes of the on-premise VMs. An incompatibility error is generated when the difference score indicates too large a difference between the OCI VM shapes and the attributes of the on-premise VM.

User selected VM shapes are combined to form a migration plan that can be in a terraform representation of the migration plan.

Once the planning of the migration is complete, the replication step of the migration can be performed. In some embodiments, the replication step is performed once, and in other embodiments, the replication step can be repeatedly performed as the on-premise assets change and/or are modified. In some embodiments, the replication step can include the creation of a snapshot of one or several assets to be replicated and the storage of that snapshot. In some embodiments, that snapshot can be stored in a golden volume group (GVG). A copy of the snapshot stored in the GVG can be created, modified, and then used in the creation of an executable stack such as a terraform stack. In some embodiments, the user can be provided with the executable stack and can modify the executable stack before executing the executable stack to thereby replicate the asset in CSPI, and specifically in the user tenancy in CSPI.

The verifying success of the migration 515 includes the launch of target assets to CSPI instances 550, the validation of instance creation in the CSPI 555, and the marking of the migration project as being completed 560. The launch of target assets to CSPI instances 550 includes the cloud migration services launching compute instances to run hydration agents during the data replication. The target assets may be launched to CSPI instances using a resource manager such as Oracle Resource Manager (ORM). The hydration agents are pooled together based on the replication location. To load balance the replication process based on the object pool, the hydration agents start automatically. These agents are then automatically terminated after they are idle and no pending replication jobs exist. During the replication workflow, the volume snapshots of the VMs are stored in the object storage. The snapshot data is deleted from object storage after hydration agents write the data to a block volume. During the replication workflow, a temporary VCN is created to provide hydration agents with connectivity to object storage. The VCN is stopped after all hydration agents are no longer active. A set of block volumes exists in the user tenancy for the entire lifespan of a migration asset. A golden volume, also referred to as a volume group, is created for each boot and data volume that is attached to the source asset such as a VM. The golden volume is kept in synchronization with snapshots created in the source environment. As part of each replication update, a new set of volumes is created and used for launching compute instances to the CSPI. The launch of the compute instances includes the launch of the assets such as VMs, including compartment, subnets, and launch dependencies. The VMs are replicated on OCI instances. The user can then mark the project as complete. This action blocks the migration modules from attempting to discover further changes to the source environment or suggesting new recommendations. After a project is marked complete, cloud migration services decouples the production environment from the migration workflow and archives migrated inventory.

Figure 6:
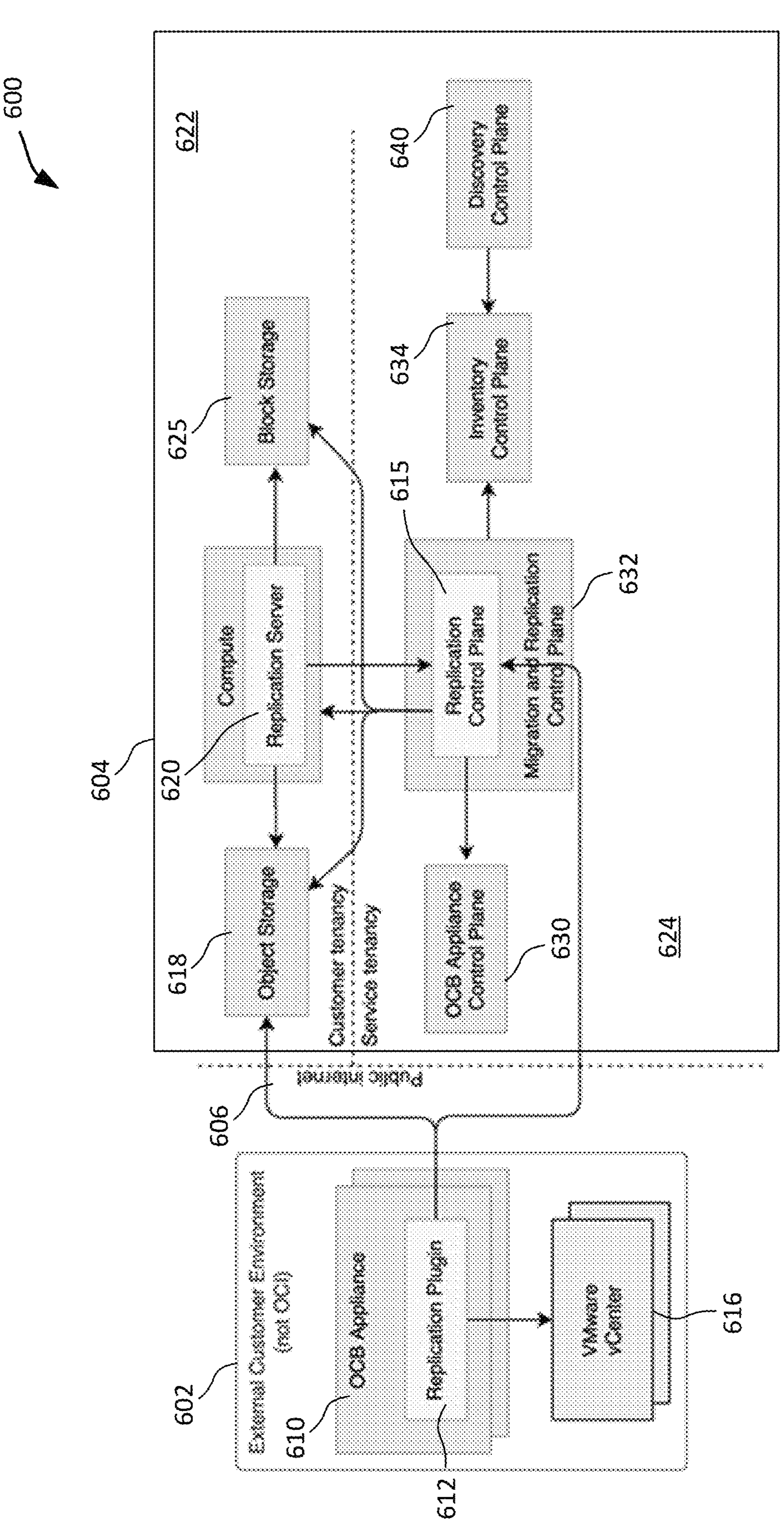
FIG. 6 is a simplified block diagram of an architecture that can be implemented for a cloud migration in accordance with various embodiments.

An exemplary embodiment of an architecture 600 that can be implemented for a migration is depicted in FIG. 6. The architecture 600 includes an external user environment 602 and a CSPI 604. The external user environment 602 includes any environment that is distinct from the CSPI 604. In some embodiments, the external user environment 602 can include an on-premises environment and/or can include a CSPI separate from CSPI 602. The CSPI 604 and the external user environment 602 are communicatively coupled via a public network 606. The public network 606 can be a wired and/or wireless communications network and can include, for example, the public Internet.

The user environment 602 includes the virtual appliance 610 (as described in detail with respect to FIGS. 4A-4C), which can include a replication plugin 612. The replication plugin 608 is an application developed by the cloud migration service and deployed by the cloud bridge service to a user's virtual appliance 610. Replication plugin 612 installation, registration, and lifecycle management may be performed by the cloud bridge service. After a replication plugin 612 starts, it registers with the replication control plane 615 and repeatedly polls the replication control plane 615 for replication tasks. Each task describes a single asset (such as a VMware VM) to be replicated, metadata for the corresponding asset source 616 (such as a vCenter), and a destination in the object storage 618 (e.g., an object storage bucket for uploading disk snapshots). Asset source credentials are retrieved from a CSPI vault or data storage directly by the replication plugin 608 using the metadata; the replication control plane 615 does not access the credentials. The credentials are kept in-memory only and re-fetched upon a replication plugin 608 restart.

During the task execution, the replication plugin 608 periodically updates the task status and progress with the replication plugin 608, which in turn is aggregated and propagated to user interface by the replication workflow. The progress is reported to the user interface as a part of the overall migration iteration progress. Replication task scheduling is performed by the replication control plane 615 according to a replication policy specified by the customer during the migration setup, as discussed with respect to FIG. 5. A policy specifies which customer assets should be migrated, how they are mapped to CSPI assets, and the frequency of migrations. A separate replication task may be created for each asset in a single iteration of a migration. This allows for maximum replication concurrency in cases where multiple cloud bridge appliances are connected to the same asset source and can perform replication tasks for the same migration in parallel.

Given the recurring nature of replications, the replication plugin 608 will perform incremental snapshots whenever possible. Specifically, if the asset source allows the replication plugin 608 to calculate and access asset disk changes since the most recently imported snapshot, only these changes will be imported by the plugin into the CSPI 604, along with corresponding metadata, and subsequently used by the replication server 620 to create the latest Golden Volume Group (a volume group corresponding to the latest imported snapshots of a customer asset's disks as-is). This optimization yields significant performance and cost improvements. It should be noted that the replication plugin 608 is an optional part of the replication components/workflow. In some instances, for data centers where the migration and replication services can have a direct access to the asset (for example, AWS Elastic Block Store direct API) and can import disk snapshots directly into the CSPI 604, there is no need for a replication plugin 608.

The CSPI 604 includes a user tenancy 622 and a service tenancy 624. The user tenancy 622 includes the object storage 618, the replication server 620, and a block storage 625. The object storage 618 is an internet-scale, storage platform that offers reliable and cost-efficient data durability to persist assets during replication. In some instances, the object storage 618 can store large amounts of unstructured data. This unstructured data can be of any content type, including analytic data and rich content, like images and videos. For example, an asset analytic API may be provided to a user to help the user aggregate asset metadata in the object storage 618 to gain insight into user's external environment (e.g., on-premises environment). The replication server 620 is a virtual machine that can, in some embodiments, read one or several asset snapshots and can write those one or several asset snapshot into one or several volumes. In some embodiments, this can, in effect, save the one or several snapshots in one or several desired locations. In some embodiments, the one or several locations to which the one or several assets are written can be volumes corresponding to one or several attributes or all or portions of each of the assets. In some embodiments, and after some modifications, these volumes can then be used to launch one or several assets in the CSPI 604 identical to the source assets. The block storage 625 is structured storage and/or storage for structured data and used to persist migrated assets after replication. In some embodiments, block storage can, for example, store data in one or several equally sized blocks. These blocks can be stored on underlying physical storage in a manner that is optimized for fast access and retrieval.

The service tenancy 624 includes an appliance control plane 630, a migration and replication control plane 632, a replication control plane 615, an inventory control plane 634, and a discovery control plane 640. The appliance control plane 630 comprises a customer facing API, deployed in the overlay, that provides management and orchestration across the cloud bridge architecture such as agent registration and agent life cycle management, as described with respect to FIGS. 4A-4C. The migration and replication control plane 632 is the main endpoint for all tasks, related to migration planning, migration execution, and replication. More specifically, migration and replication control plane 632 comprises a customer facing API, deployed in the overlay, responsible for managing migrations resources, scheduling and triggering asset migrations, and responsible for coordinating asset replications. The replication control plane 615 comprises a customer facing API, deployed in the overlay, responsible for replication of the one or several source assets. The inventory control plane 634 comprises a customer facing API, deployed in the overlay, responsible for managing assets and metadata thereof in the inventory. The discovery control plane 640 comprises a customer facing API, deployed in the overlay, responsible for configuring discovery and coordinating discovery plugins.

Replication

A user may have one or several local resources and/or resources within one environment which the user desires to migrate into another environment, and specifically into the CSPI. This can include, for example, migrating one or several resources from an on-premise environment into the CSPI, migrating one or several resources from another CSPI to the CSPI, migrating one or several resources from one portion of the CSPI to another portion of the CSPI such as, for example, from one tenancy in the CSPI to another tenancy in the CSPI, or the like. These local resources can include for example, one or several VMs, databases, directories, or the like. Thus, in some embodiments, migration of one or several resources to the CSPI can include the migration of the one or several VMs, databases, directories, libraries, and/or the like into the CSPI. This migration can include, for example, the replication of these local resources within the CSPI.

Conventionally, the user experience for migration to a CSPI and/or to a tenancy in the CSPI is complicated and can be time consuming. Currently, user migrations can be provided via a patchwork approach. In such an approach, for example, users with a large amount of local resources to be migrated large customers can be provided dedicated migration assistance. However, such personalized assistance does not scale. As a result, users with smaller migration needs can use a combination of third-party products and consultants to migrate their workloads to the CSPI.

The challenges of migration likewise apply to replication. For example, replication may also be handled in a patchwork work manner. Further, as services being replicated can, in some embodiments, change, it can be challenging to determine which instance in time to replicate. For example, information in a database to be replicated or being replicated may be updated, likewise a VM to be replicated or being may be updated and/or modified. In some embodiments, replication can be performed with a cutoff time. In such an embodiment, any changes made after the cutoff time are not captured by the replication. Use of such a cutoff time thus does not provide ideal replication.

Embodiments disclosed herein relate to systems, methods, and media replication that can be, for example, part of a migration process. The migration can include gathering information about one or several local resources, which can include, for example, one or several VMs, databases, libraries, directories, and/or the like. In some embodiments, the gathering of information can include generating one or several snapshots of the local resources and/or information relating to the capabilities of the environment containing the local resources. These capabilities can include, for example, hardware capabilities and/or availability such as, for example, a number of central processing units (CPUs), a number of graphic processing units (GPUs), and/or information relating to memory including memory quantity, type, and/or capabilities. In some embodiments, the gathered information can include, for example, information relating to network capabilities such as, for example, network speed, bandwidth, or the like.

In some embodiments, this environment is not within the CSPI and can be, for example, an on-premise environment or in the cloud but outside of the CSPI, in another CSPI, or the like. In some embodiments, resources can be migrated from one location in the CSPI to another location in the CSPI such as, for example, from one tenancy in the CSPI to another tenancy in the CSPI In some embodiments, the information gathered can be gathered by the replication plugin 612 running on the virtual appliance 610. Thus, in some embodiments, the snapshot can be generated by the replication plugin 612 running on the virtual appliance 610. In some embodiments, the virtual appliance 610 can be a virtual machine running in the environment containing the local resources, or in other words, in the initial environment. In some embodiments, the initial environment can be, for example, the external user environment 602.

The snapshot can, in some embodiments, be stored within an object storage, which can be part of the CSPI. In some embodiments, the object storage can comprise memory provided as a service by the CSPI, which memory can store any data in any format. In some embodiments, the object storage can comprise unstructured memory. In some embodiment, the object storage can be accessible by the replication plugin 612 and/or by the virtual appliance 610.

The snapshot can be read from the object storage by the replication server 620, which can be a VM and/or can be running on a VM in the user tenancy 622 of the CSPI 604. In some embodiments, and before the replication server 620 reads the snapshot from the object storage, the replication server 620 can be provisioned to the environment into which the local resource is being replicated, into the CSPI 604 into which the local resource is being replicated, and/or into the user tenancy 622 into which the local resource is being replicated. In some embodiments, the local resource such as a VM can be replicated into the environment into which the replication server 620 is provisioned after the replication server 620 has been successfully provisioned into that environment.

The replication server 620 can, from the snapshot, create one or more volumes, which volumes can be stored in a block storage. The block storage can be part of the CSPI 604 and can comprise memory provided as a service by the CSPI 604. In some embodiments, the memory of the block storage can comprise structured memory which can, in some embodiments, replicate and/or emulate structure of one or several physical disks. In some embodiments, the block storage can be accessible from inside of the CSPI 604, but not from outside of the CSPI 604. Thus, in some embodiments, neither the replication plugin 612 nor the virtual appliance 610 can store the snapshot in the block storage.

In some embodiments, and when creating the golden volume group, also referred to herein as a volume group, in the block storage, the replication server 620 can create one or several volumes for each local resource to be migrated and/or replicated. Thus, in some embodiments, one or several volumes can be created in the block storage for each of the one or several VMs, database, libraries, directories, and/or the like being migrated to the CSPI 604.

In some embodiments, these volumes can include one or several boot volumes and/or one or several data volumes. In some embodiments, volumes created for a local resource can be associated with each other into a volume group. Thus, in an embodiment in which a VM is being migrated, the replication server 620 can create at least one boot volume in the block storage for the VM, at least one data volume in the block storage, and can associate the at least one boot volume and the at least one data volume. In some embodiments, each of the volumes created in the block storage can be assigned an identifier, which can comprise an address of the volume. The address of the volume can identify a location at which the volume is stored. In some embodiments, the identifier and/or the address can be unique to the volume with which it is associated. In some embodiments, this can include, for example, providing an identifier and/or address to the boot volume stored in the block storage and an identifier and/or address to the data volume stored in the block storage.

In some embodiments, the volumes stored in the volume group in the block storage are not changed and/or modified, but rather provide a constant source of the state of the local resource being replicated at the time of the generation of the snapshot.

A copy of the boot volume is generated based on the boot volume in the data volume in the block storage. This copy of the boot volume can be generated by the replication server 620. In some embodiments an identifier and/or an address is provided for the copy of the boot volume. In some embodiments, and based on information gathered from the local environment and relating to the capabilities of the local environment, the copy of the boot volume is modified based on the capabilities of the user tenancy 622 in the CSPI 604. In some embodiments, this can include determining capabilities of the user tenancy. These capabilities can include, for example, computing and/or processing capabilities, memory, and/or networking capabilities. The capabilities of the user tenancy 622 in the CSPI 604 can be compared with the information identifying the capabilities of the local environment containing local resource corresponding with the copied boot volume. Based on the difference between the capabilities of the local environment containing the copied boot volume and the capabilities of the user tenancy 622, the copy of the boot volume can be modified. In some embodiments, this can include modifying the copy of the boot volume such that the VM created in the user tenancy 622 by execution of the copied boot volume is compatible with the user tenancy 622 of the CSPI 604.

In some embodiments, migrating a virtual machine to the CSPI 604 can entail some OS level boot volume modifications to ensure that the migrated instance boots. More specifically, in some embodiments, the OS level boot volume modifications ensure that the migrated instance boots up successfully on the hypervisor in the user tenancy 622 of the CSPI 604.

In some embodiments, these modifications can include automatically applying desired configuration changes on the boot volume. These changes can include, for example, installation of one or several kernel module when not present, which kernel modules can include, for example, one or several virtio kernel modules. In some embodiments, the changes can include installation of one or several storage attachment updates, and/or kernel parameters for serial console access. In some embodiments, these changes can include, for example, configuring of the storage area network (SAN) policy, enabling remote desktop (RDP) connections, and/or configuring the network.

In some embodiments, the modified boot volume can be created in the same compartment where the replicated VM based on the modified boot volume is launched. Thus, in some embodiments, the modified boot volume can be created by the replication server 620. In some embodiments, the modified boot volume can be associated with the replication server 620 until the replication server instance is terminated upon completion of the replication and/or the migration.

In some embodiments, and after the boot volume has been modified, a Resource Manager Service ("RMS") stack can be generated. In some embodiments, the RMS stack can include any boot volume(s) and/or data volume(s) for replication of a local resource, and specifically for replication a VM from a local environment to a user tenancy 622 in the CSPI 604. In some embodiments, the RMS stack, when executed, can replicate the local resource, and specifically the VM corresponding to the RMS stack. In some embodiments, the RMS stack can be in terraform configuration, and can be a terraform stack.

In some embodiments, the RMS stack and/or the terraform stack can be generated by the replication server 620. In some embodiments, the RMS stack and/or the terraform stack can be generated by the replication server 620 based on the snapshot captured by the replication plugin 612, and specifically based on the modified copy of the boot volume. In some embodiments, the terraform stack can include the identifier and/or the address of volumes corresponding to the terraform stack. Thus, in some embodiments, the terraform stack can include an identifier and/or an address for the boot volume(s) embodied in the terraform stack, and/or in some embodiments, the terraform stack can include an identifier and/or an address for the data volume(s) embodied in the terraform stack.

The terraform stack can be provided to the user, and specifically can be provided to the replication server 620 in the user tenancy 622 in the CSPI 604. In some embodiments, the terraform stack is modifiable by the user before execution of the terraform stack. In some embodiments, the user can modify the terraform stack. This can include, for example, customizing aspects of the terraform stack to conform to one or several user needs. These modifications can, in some embodiment, be made directly in the terraform stack, including in the portion of the terraform stack corresponding to the modified copy of the boot volume and/or to the data volume. In some embodiments, the user can execute the terraform stack to replicate the local resource being migrated to the user tenancy 622, and specifically to replicate the VM being migrated to the user tenancy 622.

In some embodiments, the process described above can be iteratively repeated. In such an embodiment, a first snapshot, also referred to as an initial snapshot of the local resource is generated by the replication plugin 612 at a first time. The initial snapshot can be generated of the local resource, such as a VM, in a first condition. Thus, in some embodiments, the snapshot can be of a VM in the initial environment in an initial configuration (VM1). In some embodiments, this initial environment is outside of the CSPI 604, or in other words, is not in the CSPI 604.

This initial snapshot can be stored in the object store by the replication plugin 612. The initial snapshot can be read from the object storage by the replication server 620 and can be written to the block storage by the replication server 620 to thereby create a volume group which can include a plurality of volumes corresponding to the initial snapshot. In some embodiments, each of these volumes can be assigned a unique identifier and/or address. In some embodiment, these volumes can include, for each local resource being replicated and specifically for each VM being replicated, at least one boot volume and at least one data volume. Thus, in some embodiments, the creation of the volume group comprising the initial snapshot of the VM residing in the initial environment includes creating a boot volume, creating a data volume associate with the boot volume, and assigning an identifier to each of the boot volume and the data volume. These volumes can be grouped into a volume group that can be associated with the local resource being replicated and specifically with the VM being replicated.

The replication server 620 can retrieve the volume groups for the local resource to be replicated, can identify the boot volume, and can generate a copy of the boot volume. The copy of the boot volume can be stored by the replication server 620 in the block storage. The replication server 620 can, in some embodiments generate an RMS stack of the copy of the boot volume. In some embodiments, the RMS stack can be a terraform stack. In some embodiments, execution of the RMS stack, and more specifically, execution of the terraform stack in an environment, such as in the CSPI 604 and/or in the user tenancy 622 in the CSPI 604 causes replication of VM1 in that environment.

In some embodiments, generating the terraform stack can include determining compatibility differences between the VM1 and the CSPI 604 and in some embodiments, the differences between the VM1 and the user tenancy 622 of the CSPI 604. In some embodiments, the compatibility differences can be the differences between the capabilities of the initial environment and the CSPI 604 and/or of the user tenancy 622 in the CSPI 604. In some embodiments, these compatibility differences can be between the hardware requirements of VM1 and the CSPI 604 and/or between VM1 and the user tenancy 622 in the CSPI 604. In some embodiments, the replicated boot volume can be modified such that the replicated VM1, or specifically VM1 as replicated in the CSPI 604 and/or in the user tenancy 622 of the CSPI 604 is compatible with the CSPI 604 and/or with the user tenancy 622 in the CSPI 604.

In some embodiments, the determination of the differences between the VM1 and the CSPI 604, or more specifically the differences between VM1 and the user tenancy 622 of the CSPI 604 can be based on information retrieved relating to the capabilities of the environment containing the local resources. In some embodiments, the replication server 620 can compare the capabilities of the initial environment to the capabilities of the user tenancy 622.

Based on the difference between the initial environment and the environment of the CSPI 604 and specifically of the user tenancy 622 in the user tenancy, the copy of the boot volume can be modified. In some embodiments, the modifying of the copy of the boot volume can include determining a first attribute of the initial environment, or specifically of the external customer environment 602, determining a second attribute of the CSPI 604, and specifically of the user tenancy 622 of the CSPI 604, determining a difference between the first attribute and the second attribute, and modifying the boot volume to compensate for the difference between the first attribute and the second attribute. In some embodiments, the first attribute characterizes hardware of the initial environment and/or the second attribute characterizes hardware of the CSPI 604 and/or the user tenancy 622 in the CSPI 604.

After the terraform stack has been generated based on the modified copy of the boot volume, the terraform stack can be provided to the user. In some embodiment, providing the terraform stack to the user can include making the terraform stack accessible to the replication server 620 in the CSPI 604, and specifically to the replication server 620 in the user tenancy 622 in the CSPI 604. In some embodiments, making the terraform stack accessible to the replication server 620 can include storing the terraform stack in the CSPI 604, in the user tenancy 622 in the CSPI 604, and/or in a location or memory accessible by the replication server 620.

In some embodiments, the terraform stack can be executed by the user, and specifically by the replication server 620 to replicate VM1 in the environment containing the replication server 620. In some embodiments, this can include replicating VM1 in the CSPI 604 and/or in the user tenancy 622 in the CSPI 604.

In some embodiments, and after generation of the initial snapshot, one or more subsequent snapshots can be generated by, in some embodiments, the replication plugin 612 in the virtual appliance 610. In some embodiments, each of the one or more subsequent snapshots can be generated at a different time after the generation of the initial snapshot. In some embodiments, one or more of these subsequent snapshots can capture a subsequent configuration of the local resource, and specifically of the VM. In some embodiments, the snapshots can occur at regular intervals after the initial snapshot or the one or more subsequent snapshots can be captured in response to an occurrence of a triggering event, such as, for example, in response to a change to the configuration of the local resource and more specifically in response to a change of the configuration of the VM. In some embodiments, the subsequent snapshot can be generated after replication of VM1. In some embodiments, the capturing of one or more subsequent snapshots can include capturing a subsequent snapshot of the VM in a second, subsequent configuration (VM2).

The subsequent snapshot, and in some embodiments, the second snapshot can stored in the object storage by the replication plugin 612, and can be read from the object storage and stored in the block storage by the replication server 620. In some embodiments the subsequent snapshot can be stored as one or several volume groups.

The subsequent snapshot can be compared to a previous snapshot, and a delta file can be generated. The subsequent snapshot can be compared to the previous snapshot by the replication server 620, and in some embodiments, the delta file can be generated by the replication server 620.

In some embodiments, the delta file can characterize differences between the previous snapshot and the subsequent snapshot. In some embodiments, the previous snapshot can be the initial snapshot, and thus the delta file can characterize differences between the initial snapshot and the subsequent snapshot. In some embodiments, the delta file can be generated via comparison between the initial snapshot and any subsequently generated snapshot. Thus, in some embodiments, the delta file can characterize a difference, for example, between the initial snapshot and a second snapshot, between the initial snapshot and a third snapshot, between the initial snapshot and a fourth snapshot, or between the initial snapshot and any other subsequent snapshot. In some embodiments, each of these delta files can be saved and/or stored, and in some embodiments, only the most recently generated delta file is saved and/or stored.

Thus, in some embodiments a plurality of subsequent snapshots can be generated, including generating additional subsequent snapshots after generating a second snapshot. In some embodiments, a corresponding delta file can be generated for each of these additional subsequent snapshots. In some embodiments, each of these delta files characterize an entire difference between the initial configuration, such as VM1, of the local resource and a subsequent configuration. Thus, in such an embodiment, a delta file corresponding to a third snapshot and a corresponding third configuration characterizes the entire difference between the third configuration and the initial configuration. Alternatively, in some embodiments, the combination of previous delta files with the current delta file together, in aggregate, characterizes the difference between the initial configuration, such as VM1, of the local resource and a subsequent configuration. Thus, in such an embodiment, a delta file corresponding to a third snapshot and a third configuration, in combination with the delta file corresponding to a second snapshot and a second configuration characterize the difference between the initial configuration, such as VM1, of the local resource and a subsequent configuration. In other words, in some embodiments, the delta file can be a single files that characterize a difference between the initial snapshot of the VM and the subsequent snapshot of the VM, whereas in other embodiments, the delta file can be a plurality of files that together characterize a difference between the initial snapshot of the VM and the subsequent snapshot of the VM.

A delta stack can be generated based on the delta file. In some embodiments, the delta stack can be in a terraform configuration, referred to herein as a delta terraform stack. In some embodiments, execution of the delta stack including for example, execution of the delta terraform stack causes the corresponding previously replicated local resource, such as, for example, the previously replicated VM to update to correspond to the subsequent configuration captured by the subsequent snapshot used in generating the delta file. In some embodiments in which VM1 was previously replicated, the execution of the delta stack, and specifically of the delta terraform stack causes previously replicated VM1 to update to replicate VM1. Thus, the capture of each subsequent snapshot can lead to the generation of a corresponding delta file, the execution of each of which delta files causes the previously replicated instance of the VM to update to the instance of the VM corresponding to the instance of the VM captured by the snapshot and associated with the delta file being executed.

In some embodiments, the subsequent delta stack for the subsequent snapshot can be provided to the user and/or can be provided to the replication server 620 in the replication environment, or in other words in the CSPI 604 and/or in the user tenancy 622 in the CSPI 604. The subsequent delta stack can be executed by the user in the replication environment, or in other words in the CSPI 604 and/or in the user tenancy 622 in the CSPI 604 to replicate VM2. In some embodiments, the subsequent delta stack can be executed in the replication environment, or in other words in the CSPI 604 and/or in the user tenancy 622 in the CSPI 604 by the replication server 620 to replicate VM2.

Figure 7:
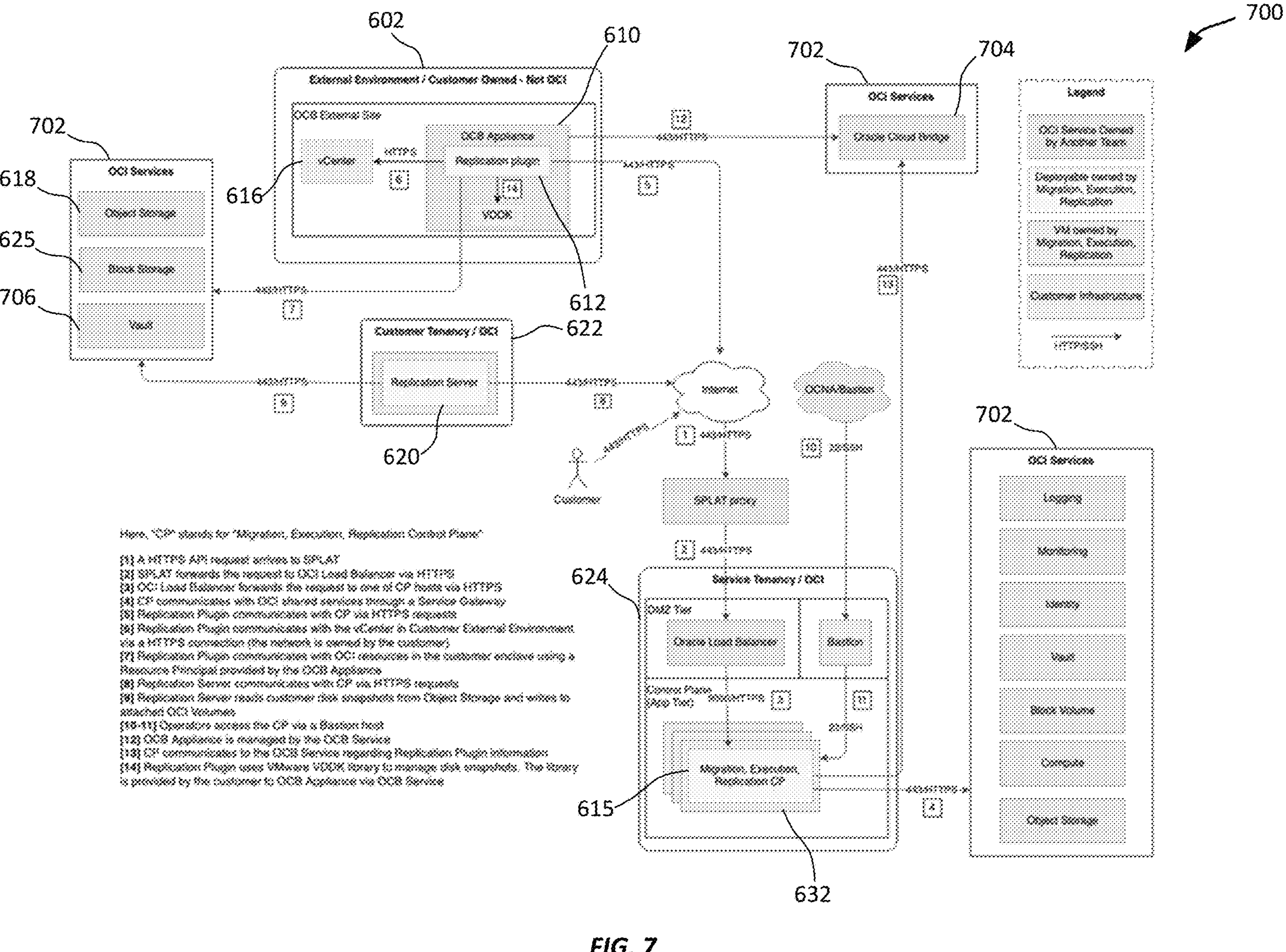
FIG. 7 depicts a schematic illustration of one embodiment of a replication process.

With reference now to FIG. 7, a schematic illustration of one embodiment of a replication process using architecture 600 is shown. As seen, FIG. 7 depicts a user environment 602. This user environment is external to CSPI 604. The user environment includes the virtual appliance 610 which can include the replication plugin 612. In some embodiments, and as previously discussed, the replication plugin 612 can be a VM running on the virtual appliance 610 in the user environment 602. In some embodiments, the replication plugin 612 can be provisioned to the user environment 602 by the cloud bridge service 704 that can be provided as one of many services 702 that can be provided in the CSPI 604 and/or in connection with the CSPI 604.

The replication plugin 612 can be an application deployed by cloud bridge service 704 to the virtual appliance 610. In some embodiments, plugin installation, registration, and lifecycle management of the replication plugin 612 can be performed by the cloud bridge service 704.

After a replication plugin 612 starts, it registers with the replication control plane 615 and repeatedly polls the CP for replication tasks. In some embodiments, each task describes a single asset (such as a VMware VM) to be replicated, metadata for the corresponding asset source 616 (such as a vCenter), and destination (e.g., an Object Storage bucket for uploading disk snapshots). Asset Source credentials can be retrieved from vault 706 directly by the replication plugin 612 using the metadata. In some embodiments, these credentials are not accessed by the replication control plane 615. In some embodiments, the credentials are kept in-memory only, and are re-fetched upon a restart of the replication plugin 612.

In some embodiments, and during the task execution, the replication plugin 912 periodically updates the task status and progress with the replication control plane 615, which in turn is aggregated and propagated to UI. The progress is reported to the UI as a part of the overall migration iteration progress.

In some embodiments, replication task scheduling can be performed by the replication control plane 615 according to a replication policy specified by the customer during setup of the migration. A policy can, in some embodiments, specify which customer assets should be migrated, how they are mapped to assets, and the frequency of migrations. A separate replication task can be created for each asset in a single iteration of a migration. In some embodiments, this can allow for maximum replication concurrency in cases where multiple virtual appliances 610 are connected to the same asset source and can perform replication tasks for the same migration in parallel.

Given the recurring nature of replications, in some embodiments, the replication plugin 612 can perform incremental snapshots. Specifically, if the asset source, or in other words, if the external user environment 602 allows the replication plugin 612 to calculate and access VM disk changes since the most recently imported snapshot, in some embodiments, only these changes are imported by the replication plugin 612 along with corresponding metadata.

FIG. 7 further depicts a replication server 620 that is in the user tenancy 622 of the CSPI 604. The replication server 620 can be a short-lived VM that reads user VM snapshots from the object storage 618 and writes them to appropriately configured volume groups in the block storage 625. The replication server 620 can run in the user tenancy 622 in a dedicated compartment and subnet, in some embodiments without a public IP, and in some embodiments, can access services 702 through a service gateway.

As indicated in FIG. 7, an API request for replication of a local resource is received from a user, which request is forwarded via a load balancer located in the service tenancy 624 to the replication control plane 615. The replication control plane 615 communicates with the services 702 via a service gateway and communicates with the replication plugin 612. The replication plugin 612 can further communicate with VM data center management software. The replication plugin 612 generates a snapshot(s) and stores the snapshot(s) in the object storage, and the replication server 620 reads the snapshot(s) from the object storage 618 and writes to the block storage 625.

Figure 8:
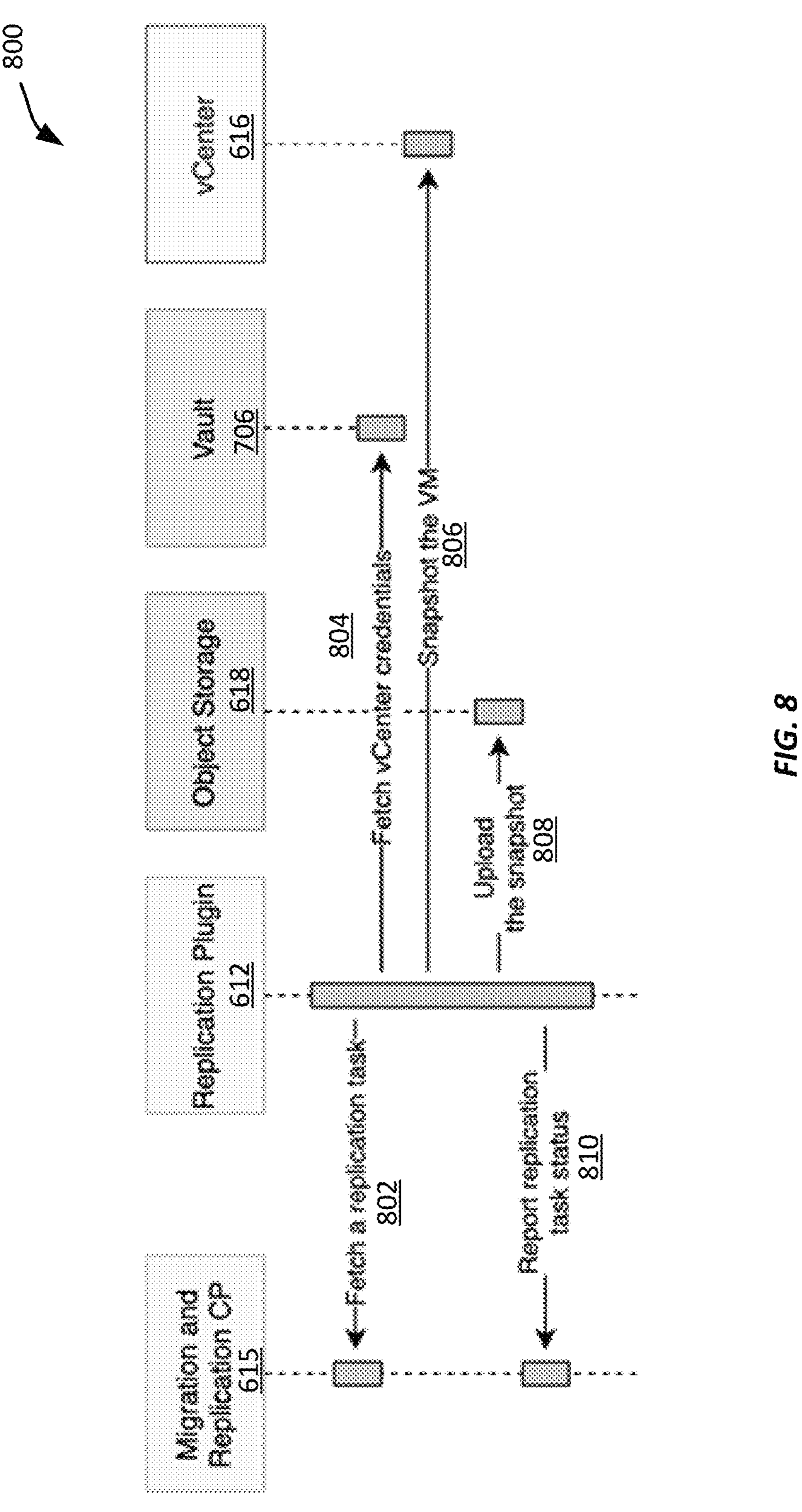
FIG. 8 is a swim lane diagram showing one embodiment of a process for generating and storing a snapshot of a local resource.

With reference now to FIG. 8, a swim lane diagram showing one embodiment of a process 800 for generating and storing a snapshot of a local resource is shown. In some embodiments, the process 800 can be performed as part of migrating and/or replicating a local resource. More specifically, in some embodiments, the process 800 can be performed as a part of creating a volume group. In some embodiments, the creating of the volume group can include generating the snapshot of the VM with the replication plugin, and storing the snapshot of the VM in an object storage.

The process 800 can be performed by all or portions of the architecture 600 shown in FIGS. 6 and/or 7. The process 800 begins at step 802, wherein the replication plugin 612 fetches and/or receives a replication task from the migration and replication control plane 615. In some embodiments, this can include the replication plugin 612 querying the migration and replication control plane 615 for any replication task and subsequently receiving the replication task from the migration and replication control plane 615. In some embodiments, this can include the migration and replication control plane 615 pushing a replication task to the replication plugin 612.

At step 804, the replication plugin 612 fetches credentials from the vault 706. In some embodiments, these credentials can be utilized by the replication plugin 612 to access the asset source 616 to create the snapshot.

At block 806, the replication plugin 612 utilizes the credentials from step 804 to access the asset source 616 and generates a snapshot of the local resource(s) designated in the replication task, and specifically of the VM(s) designated in the replication task. This local resource can be in an initial configuration or in a subsequent configuration. As used herein an initial configuration is the configuration of the local resource at the time of generation of a first snapshot of that local resource, and a subsequent configuration is any configuration different than the initial configuration and occurring after the generation of the first snapshot.

At step 808, the replication plugin 612 uploads the snapshot to the object storage. At step 810, the status of the replication task is reported by the replication plugin 612 to the migration and replication control plane 615.

Figure 9:
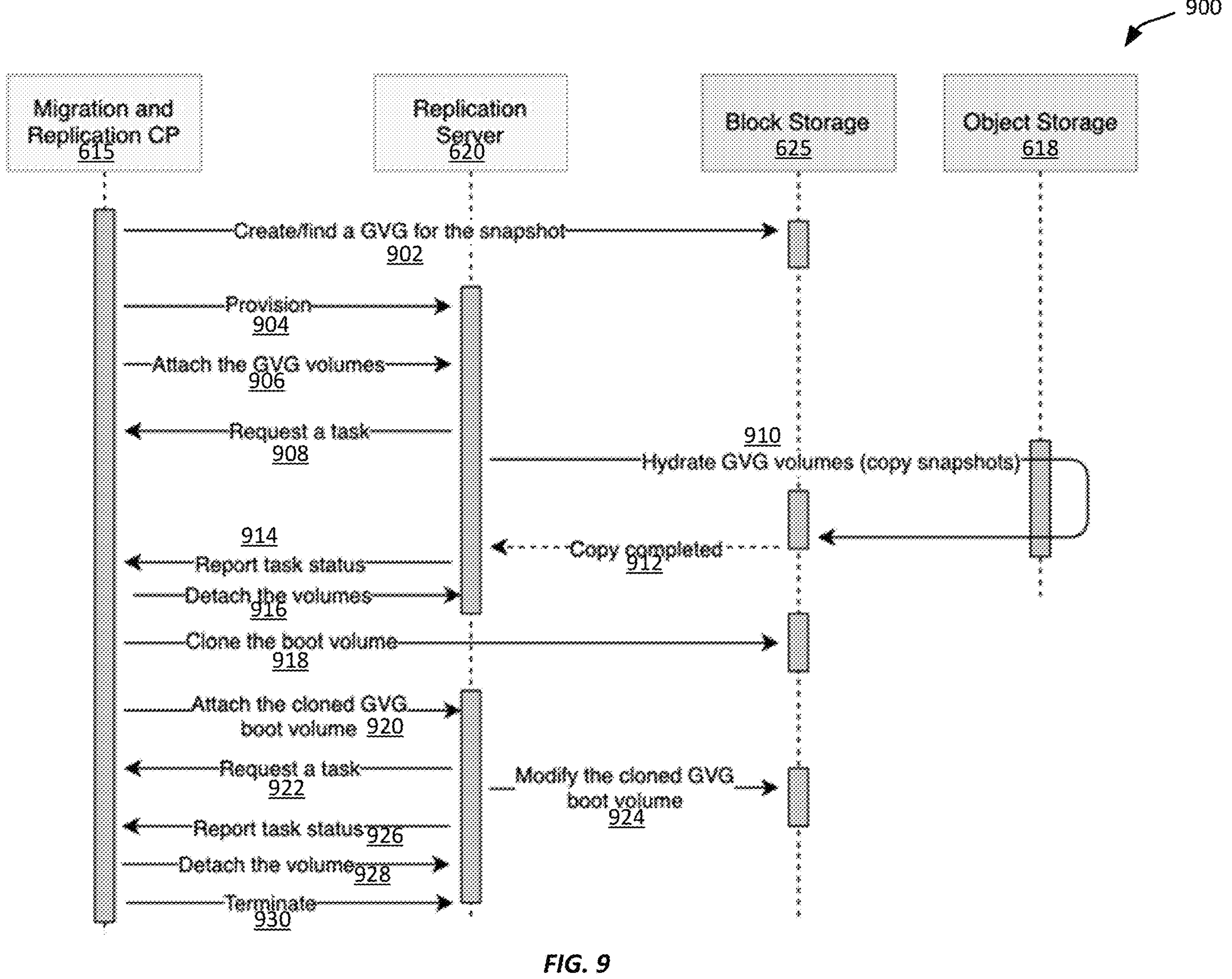
FIG. 9 is a swim lane diagram illustrating one embodiment of the process for replicating a local resource based on a snapshot.

With reference now to FIG. 9, a swim lane diagram illustrating one embodiment of the process 900 for replicating a local resource based on a snapshot is shown. The process 900 can be performed by all or portions of the architecture 600 shown in FIGS. 6 and/or 7. The process 900 begins at step 902, wherein a volume group in the block storage 625 for the snapshot is found and/or created. In some embodiments, this can include the creation and/or allocation of memory for storing the contents of the snapshot to be written to the block storage 625. In some embodiments, the migration and replication control plane 615 can interact with the block storage 625 to find and/or create the allocated memory and/or volumes for containing the contents of the snapshot to be written to the block storage 625.

At step 904, the replication server 620 is provisioned to the CSPI 604 and specifically to the user tenancy 622 in the CSPI 604 into which the local resource is to be replicated. In some embodiments, the replication server 620 can be provisioned to the user tenancy 622 by the migration and replication control plane 615.

At step 906 the migration and replication control plane 615 attaches volumes created in step 902 to the replication server 620. In some embodiments, the attaching of the volumes to the replication server 620 provides the replication server 620 with access to the data in the volumes. In some embodiments, attaching the volumes to the replication server 620 thus provides the replication server 620 access to the volumes created in step 902 and/or to the memory allocated in step 902.

At step 908 the replication server 620 requests a task, and specifically a replication task from the migration and replication control plane 615. In some embodiments, and in response to this request, the migration and replication control plane 615 provides the replication server the task of writing the snapshot contained in the object storage 618 to the block storage 625, and specifically into the attached volumes. This writing of the snapshot to the block storage 625 and specifically to the attached volumes is also referred to herein as hydrating the volumes.

At step 910, the replication server 620 hydrates the volumes. This includes reading the snapshot from the object storage 625, and writing the snapshot to the attached volumes. In some embodiments, this can include writing all or portions of the snapshot to one or several boot volumes and/or writing all or portions of the snapshot to one or several volume groups. In some embodiments, and for a VM, hydrating the volumes can include writing all or portions of the snapshot into one or several boot volumes and/or into one or several volume groups. In some embodiments these volumes can be stored in the block storage 625. At step 912, the replication server 620 is notified that the hydrating of the volumes is completed, and at step 914, the replication server reports that the task of hydrating the volumes is complete to the migration and replication control plane 615. At step 916, the volumes are detached, thereby terminating access by the replication server 620 to the data in the volumes.

At step 918, the migration and replication control plane 615 directs the block storage 625 to clone all or portions of the volume group created in step 902. In some embodiments, this can include replicating at least a portion of the volume group, which can include identifying the volume group, and replicating a boot volume from the volume group.

In some embodiments, the migration and replication control plane 615 directs the block storage 625 to clone the boot volume of the volume group created in step 902. At step 920, and after all or portions of the volume group is cloned, the migration and replication control plane 615 attaches all or portions of the cloned volume group to the replication server 620, thereby giving the replication server 620 access to the clone volume group. In some embodiments, this includes the migration and replication control plane 615 attaching the cloned boot volume to the replication server 620.

At step 922, the replication server 620 requests the migration and replication control plane 615 for a task, and specifically for a replication task. In response to this request, the migration and replication control plane 615 provides the replication server 620 with a task, and specifically with the task of modifying the cloned all or portions of the volume group. In some embodiments, the migration and replication control plane 615 provides the replication server 620 with the task of modifying the clone boot volume.

At step 924, the replication server 620 modifies the attached cloned volume. In some embodiments, this can include modifying the attached boot volume. In some embodiments, modifying the attached boot volume can include determining a first attribute of the initial environment, determining a second attribute of the CSPI 604, and specifically of the user tenancy 622, determining a difference between the first attribute and the second attribute, and modifying the boot volume to compensate for the difference between the first attribute and the second attribute. In some embodiments, the first attribute characterizes hardware of the initial environment and the second attribute characterizes hardware of the user tenancy 622 in the CSPI 604.

In some embodiments, the modified cloned volume can be used in generating the RMS stack, which RMS stack can be a terraform stack. In some embodiments, the identifier and/or address associated with the volume group and/or with portions of the volume group can be included in the RMS stack, and specifically can be included in the terraform stack. In some embodiments, the RMS stack, and specifically, the terraform stack can be provided to the user. The RMS stack can be executed by the user in the user tenancy 622 and/or in the CSPI 604 to replicate the local resource corresponding to the CSPI. In some embodiments, the user can modify the RMS stack before executing the RMS stack. In some embodiments, the replication server 620 can execute the terraform stack in the CSPI 604 and/or in the user tenancy 622.

At block 926, and after completion of modifying the cloned boot volume, the replication server 620 reports the completion of the modifying of the cloned boot volume to the migration and replication control plane 615. At block 928, the cloned boot volume is detached by the migration and replication control plane 615 from the replication server 620. In some embodiments, the migration and replication control plane 615 instructs the replication server 620 to terminate process 900 at step 930.

Figure 10:
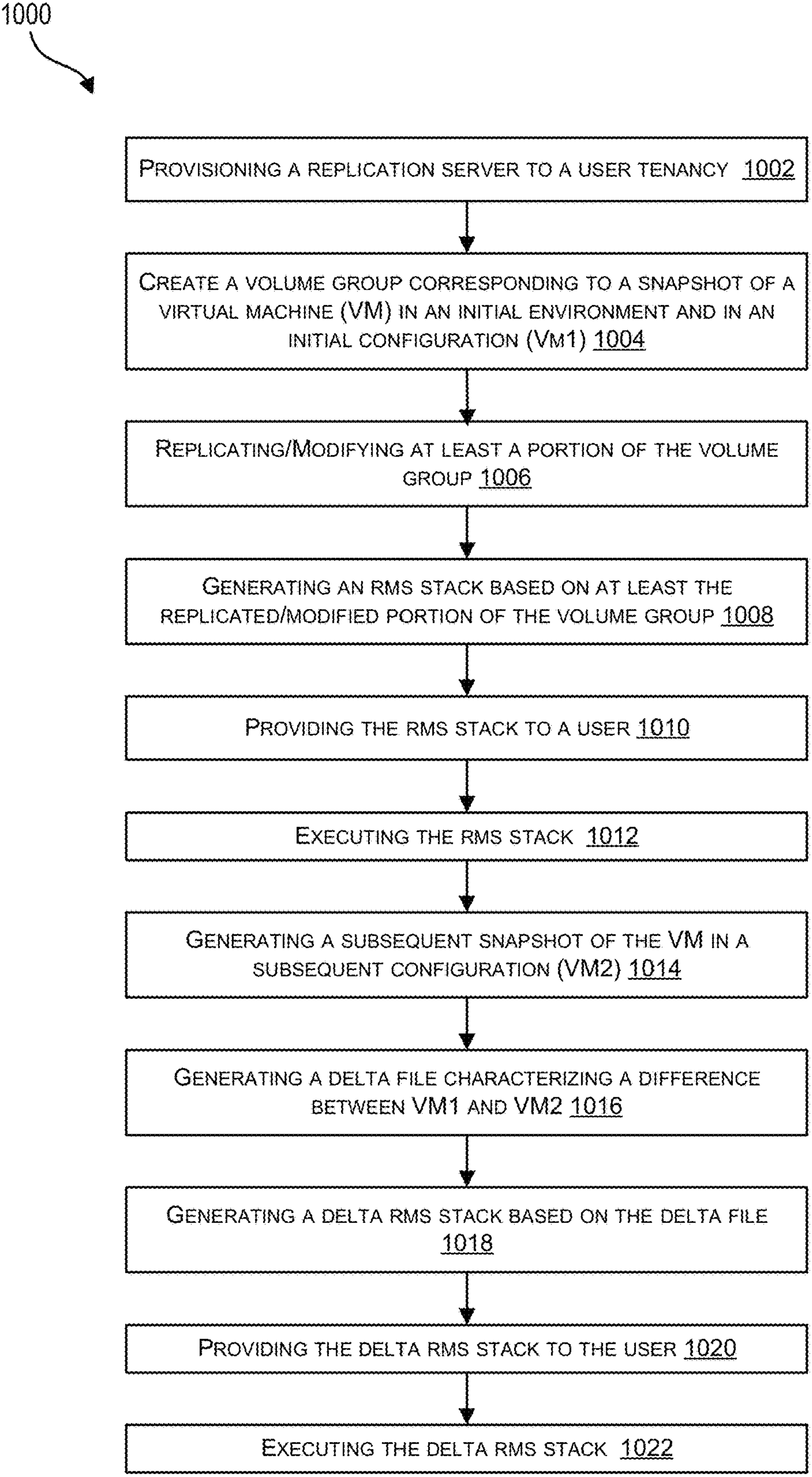
FIG. 10 is a flowchart illustrating one embodiment of a process for iterative replication of a local resource.

With reference now to FIG. 10, a flowchart illustrating one embodiment of a process 1000 for iterative replication of a local resource is shown. The process 1000 can be performed by all or portions of the architecture 600 shown in FIGS. 6 and/or 7. The process 1000 begins at step 1002, wherein a replication server 620 is provisioned to a user tenancy 622. In some embodiments, the replication server 620 can be provisioned to the user tenancy 622 by the migration and replication control plan 615.

At step 1004, a volume group is created that corresponds to a snapshot of a virtual machine VM in an initial environment and in an initial configuration (VM1). In some embodiments, this can include generating the snapshot with the replication plugin 612 and storing the snapshot to object storage 618. The volume group can be created by the migration and replication control plane 615 and the volume (s) of the volume group can be attached to the replication server 620. The replication server can hydrate the volume group by reading information from the object storage 618 and writing that information to the volume group in the block storage 625. At the completion of the creation of the volume group, the volumes can be detached from the replication server 620.

At step 1006, at least a portion of the volume group is replicated and/or modified. In some embodiments, this can include the creation of a copy of at least a portion of the volume group and the attaching of the cloned all or portions of the volume group to the replication server 620. Based on information relating to the initial environment and to the user tenancy 622, the replication server 620 can modify the clone of at least the portion of the volume group to increase compatibility between the to be replicated local resource and the user tenancy 622 in which the local resource is to be replicated.

At block 1008, an RMS stack is generated based on the replicated/modified at least portions of the volume group. In some embodiments, this can include generating a terraform stack corresponding to one or more boot volumes and/or one or more data volumes of the volume group. The RMS stack can, in some embodiments, be generated by the replication server 620 and/or by the migration and replication control plane 615. In some embodiments, execution of the RMS stack causes creation of a replicated local resource in the environment in which the RMS stack is executed.

The RMS stack can be provided as indicated in step 1010, and in some embodiments, is provided to the user. At step 1012, the RMS stack can be executed. In some embodiments, the RMS stack can be executed in the CSPI 604 and/or in the user tenancy 622. The RMS stack can be executed by the user and/or by the replication server 620. In some embodiments, and before execution of the RMS stack, the RMS stack can be modified by the user.

At step 1014, a subsequent snapshot of the VM in a subsequent configuration (VM2) is generated. In some embodiments, this can include generating the subsequent snapshot with the replication plugin 612 and storing the subsequent snapshot to object storage 618. The replication server 620 can, as discussed above, read the subsequent snapshot from the object storage 618 and can write the subsequent snapshot to the block storage 625. In some embodiments, this can include updating the data volume and/or creating a new data volume for the updated snapshot.

At step 1016, a delta file characterizing a difference between VM1 and VM2 is generated. This delta file can be generated by comparing stored information associated with the initial snapshot of VM1 and with the subsequent snapshot of VM2, and determining the differences between VM1 and VM2. The delta file can, in some embodiments, be generated by the replication server 620 and can be stored in the block storage 625.

At step 1018, a delta RMS stack is generated based on the delta file. In some embodiments, and similar to discussion above with respect to generation of the RMS stack, the generation of the delta RMS stack can include modifying the delta file to achieve compatibility between VM2 and the user tenancy 622. The delta RMS stack can, in some embodiments, be in terraform format, and can be a delta terraform stack. The delta RMS stack can, in some embodiments, be generated by the replication server 620 and can be stored in the block storage 625.

The delta RMS stack can be provided as indicated in step 1020, and in some embodiments, is provided to the user. At step 1022, the delta RMS stack can be executed. In some embodiments, the delta RMS stack can be executed in the CSPI 604 and/or in the user tenancy 622. The delta RMS stack can be executed by the user and/or by the replication server 620. In some embodiments, and before execution of the delta RMS stack, the delta RMS stack can be modified by the user. In some embodiments, execution of the delta RMS stack replicates VM2 in the environment in which the delta RMS stack is executed. In some embodiments, execution of the delta terraform stack causes previously replicated VM1 to update to replicate VM2.

Figure 11:
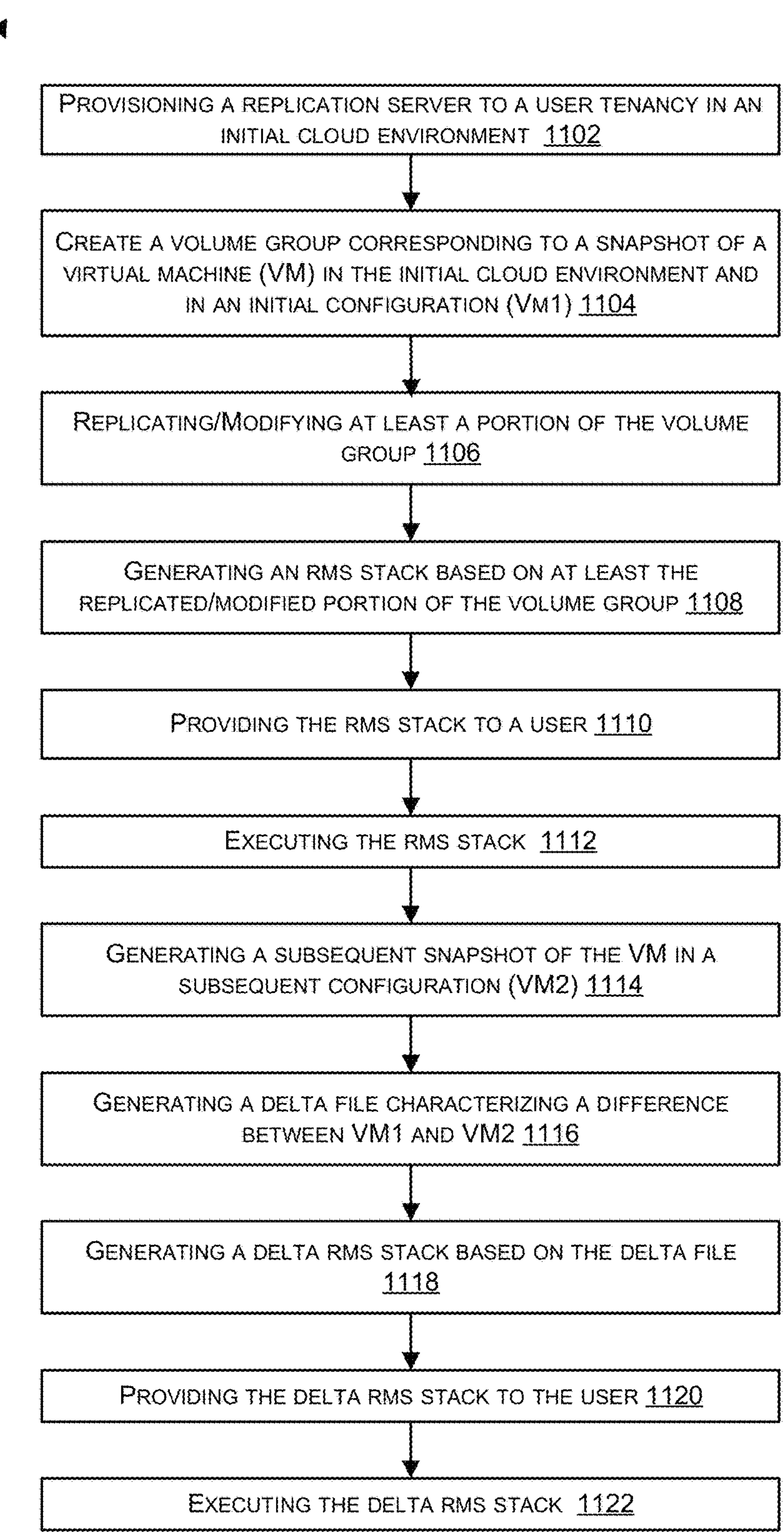
FIG. 11 is a flowchart illustrating one embodiment of a process for iterative replication of a resource from one cloud environment into another cloud environment.
Figure 16:
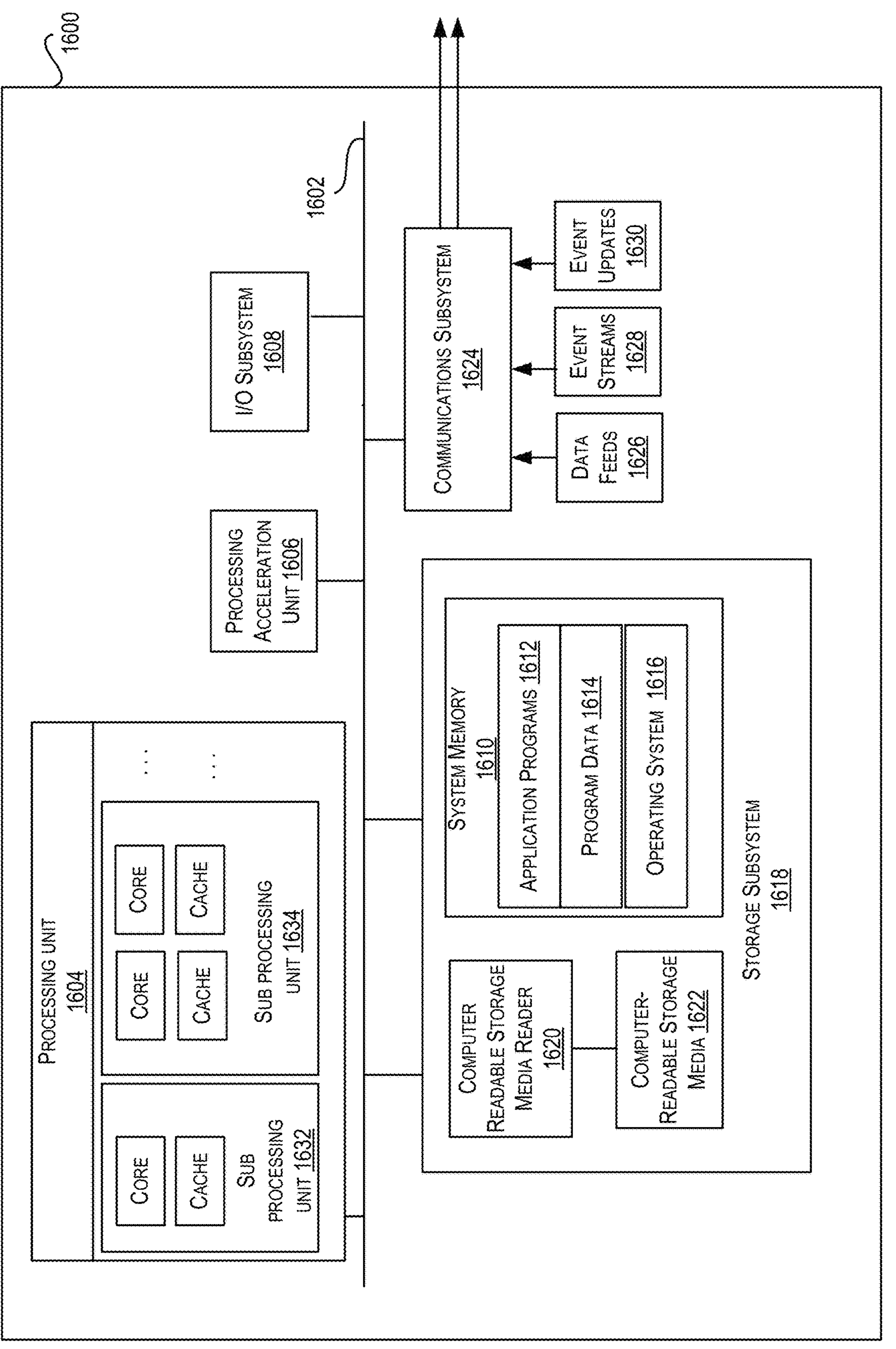
FIG. 16 is a block diagram illustrating an example computer system, according to at least one embodiment.

With reference now to FIG. 11, a flowchart illustrating one embodiment of a process 1100 for iterative replication of a local resource from one cloud environment to another cloud environment is shown. In some embodiments, the replication of process 1100 can be performed when a resource is being replicated from a first cloud environment such as an initial tenancy in an initial CSPI to a second tenancy of the user in a second CSPI. In some embodiments, the initial tenancy can be located in a cloud environment separate and/or distinct from the CSPI. The process 1100 can be performed by all or portions of the architecture 600 shown in FIGS. 6 and/or 7. The process 1100 begins at step 1102, wherein a replication server 620 is provisioned to a user tenancy 622. The user tenancy 622 can be an initial tenancy, which initial tenancy can be in a first CSPI. In some embodiments, the replication server 620 can be provisioned to the user tenancy 622 by the migration and replication control plan 615.

At step 1104, a volume group is created that corresponds to a snapshot of a virtual machine VM that is in the initial cloud environment and that is in an initial configuration (VM1). In some embodiments, this can include generating the snapshot with the replication plugin 612 and storing the snapshot to object storage 618. The volume group can be created by the migration and replication control plane 615 and the volume(s) of the volume group can be attached to the replication server 620. The replication server can hydrate the volume group by reading information from the object storage 618 and writing that information to the volume group in the block storage 625. At the completion of the creation of the volume group, the volumes can be detached from the replication server 620.

At step 1106, at least a portion of the volume group is replicated and/or modified. In some embodiments, this can include the creation of a copy of at least a portion of the volume group and the attaching of the cloned all or portions of the volume group to the replication server 620. Based on information relating to the initial cloud environment and to the user tenancy 622, the replication server 620 can modify the clone of at least the portion of the volume group to increase compatibility between the to be replicated local resource and the user tenancy 622 in which the local resource is to be replicated.

At block 1108, an RMS stack is generated based on the replicated/modified at least portions of the volume group. In some embodiments, this can include generating a terraform stack corresponding to one or more boot volumes and/or one or more data volumes of the volume group. The RMS stack can, in some embodiments, be generated by the replication server 620 and/or by the migration and replication control plane 615. In some embodiments, execution of the RMS stack causes creation of a replicated local resource in the environment in which the RMS stack is executed.

The RMS stack can be provided as indicated in step 1110, and in some embodiments, is provided to the user. At step 1112, the RMS stack can be executed. In some embodiments, the RMS stack can be executed in the CSPI 604 and/or in the user tenancy 622. The RMS stack can be executed by the user and/or by the replication server 620. In some embodiments, and before execution of the RMS stack, the RMS stack can be modified by the user.

At step 1114, a subsequent snapshot of the VM in a subsequent configuration (VM2) is generated. In some embodiments, this can include generating the subsequent snapshot with the replication plugin 612 and storing the subsequent snapshot to object storage 618. The replication server 620 can, as discussed above, read the subsequent snapshot from the object storage 618 and can write the subsequent snapshot to the block storage 625. In some embodiments, this can include updating the data volume and/or creating a new data volume for the updated snapshot.

At step 1116, a delta file characterizing a difference between VM1 and VM2 is generated. This delta file can be generated by comparing stored information associated with the initial snapshot of VM1 and with the subsequent snapshot of VM2, and determining the differences between VM1 and VM2. The delta file can, in some embodiments, be generated by the replication server 620 and can be stored in the block storage 625.

At step 1118, a delta RMS stack is generated based on the delta file. In some embodiments, and similar to discussion above with respect to generation of the RMS stack, the generation of the delta RMS stack can include modifying the delta file to achieve compatibility between VM2 and the user tenancy 622. The delta RMS stack can, in some embodiments, be in terraform format, and can be a delta terraform stack. The delta RMS stack can, in some embodiments, be generated by the replication server 620 and can be stored in the block storage 625.

The delta RMS stack can be provided as indicated in step 1120, and in some embodiments, is provided to the user. At step 1122, the delta RMS stack can be executed. In some embodiments, the delta RMS stack can be executed in the CSPI 604 and/or in the user tenancy 622. The delta RMS stack can be executed by the user and/or by the replication server 620. In some embodiments, and before execution of the delta RMS stack, the delta RMS stack can be modified by the user. In some embodiments, execution of the delta RMS stack replicates VM2 in the environment in which the delta RMS stack is executed. In some embodiments, execution of the delta terraform stack causes previously replicated VM1 to update to replicate VM2.

Illustrative Systems

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS users may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Users can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the user may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep breaches contained. Additionally, the DMZ tier 1120 can include one or more load balancer (LB) subnet(s) 1122, a control plane app tier 1124 that can include app subnet(s)

1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or users, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Metadata that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the user, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or users from interacting with other users', or other users', resources. Also, this embodiment may allow users or users of the system to store databases privately without needing to rely on public Internet 1154, which may not have a desired level of threat prevention, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a user of the IaaS provider without calling public Internet 1154. Users of the IaaS provider may desire this embodiment since database(s) that the users use may be controlled by the IaaS provider and may be stored on the service tenancy 1119, which may be isolated from public Internet 1154.

FIG. 12 is a block diagram 1200 illustrating another example pattern of an IaaS architecture, according to at least one embodiment. Service operators 1202 (e.g., service operators 1102 of FIG. 11) can be communicatively coupled to a secure host tenancy 1204 (e.g., the secure host tenancy 1104 of FIG. 11) that can include a virtual cloud network (VCN) 1206 (e.g., the VCN 1106 of FIG. 11) and a secure host subnet 1208 (e.g., the secure host subnet 1108 of FIG. 11). The VCN 1206 can include a local peering gateway (LPG) 1210 (e.g., the LPG 1110 of FIG. 11) that can be communicatively coupled to a secure shell (SSH) VCN 1212 (e.g., the SSH VCN 1112 of FIG. 11) via an LPG 1110 contained in the SSH VCN 1212. The SSH VCN 1212 can include an SSH subnet 1214 (e.g., the SSH subnet 1114 of FIG. 11), and the SSH VCN 1212 can be communicatively coupled to a control plane VCN 1216 (e.g., the control plane VCN 1116 of FIG. 11) via an LPG 1210 contained in the control plane VCN 1216. The control plane VCN 1216 can be contained in a service tenancy 1219 (e.g., the service tenancy 1119 of FIG. 11), and the data plane VCN 1218 (e.g., the data plane VCN 1118 of FIG. 11) can be contained in a user tenancy 1221 that may be owned or operated by users, or users, of the system.

The control plane VCN 1216 can include a control plane DMZ tier 1220 (e.g., the control plane DMZ tier 1120 of FIG. 11) that can include LB subnet(s) 1222 (e.g., LB subnet(s) 1122 of FIG. 11), a control plane app tier 1224 (e.g., the control plane app tier 1124 of FIG. 11) that can include app subnet(s) 1226 (e.g., app subnet(s) 1126 of FIG. 11), a control plane data tier 1228 (e.g., the control plane data tier 1128 of FIG. 11) that can include database (DB) subnet(s) 1230 (e.g., similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g., the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g., the service gateway 1136 of FIG. 11) and a network address translation (NAT) gateway 1238 (e.g., the NAT gateway 1138 of FIG. 11). The control plane VCN 1216 can include the service gateway 1236 and the NAT gateway 1238.

The control plane VCN 1216 can include a data plane mirror app tier 1240 (e.g., the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g., the VNIC of 1142) that can execute a compute instance 1244 (e.g., similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g., the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g., the metadata management service 1152 of FIG. 11) that can be communicatively coupled to public Internet 1254 (e.g., public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g., cloud services 1156 of FIG. 11).

In some examples, the data plane VCN 1218 can be contained in the user tenancy 1221. In this case, the IaaS provider may provide the control plane VCN 1216 for each user, and the IaaS provider may, for each user, set up a unique compute instance 1244 that is contained in the service tenancy 1219. Each compute instance 1244 may allow communication between the control plane VCN 1216, contained in the service tenancy 1219, and the data plane VCN 1218 that is contained in the user tenancy 1221. The compute instance 1244 may allow resources, that are provisioned in the control plane VCN 1216 that is contained in the service tenancy 1219, to be deployed or otherwise used in the data plane VCN 1218 that is contained in the user tenancy 1221.

In other examples, the user of the IaaS provider may have databases that live in the user tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the user tenancy 1221, but the data plane mirror app tier 1240 may not exist in the data plane VCN 1218 or be owned or operated by the user of the IaaS provider. The data plane mirror app tier 1240 may be configured to make calls to the data plane VCN 1218 but may not be configured to make calls to any entity contained in the control plane VCN 1216. The user may desire to deploy or otherwise use resources in the data plane VCN 1218 that are provisioned in the control plane VCN 1216, and the data plane mirror app tier 1240 can facilitate the desired deployment, or other usage of resources, of the user.

In some embodiments, the user of the IaaS provider can apply filters to the data plane VCN 1218. In this embodiment, the user can determine what the data plane VCN 1218 can access, and the user may restrict access to public Internet 1254 from the data plane VCN 1218. The IaaS provider may not be able to apply filters or otherwise control access of the data plane VCN 1218 to any outside networks or databases. Applying filters and controls by the user onto the data plane VCN 1218, contained in the user tenancy 1221, can help isolate the data plane VCN 1218 from other users and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

FIG. 13 is a block diagram 1300 illustrating another example pattern of an IaaS architecture, according to at least one embodiment. Service operators 1302 (e.g., service operators 1102 of FIG. 11) can be communicatively coupled to a secure host tenancy 1304 (e.g., the secure host tenancy 1104 of FIG. 11) that can include a virtual cloud network (VCN) 1306 (e.g., the VCN 1106 of FIG. 11) and a secure host subnet 1308 (e.g., the secure host subnet 1108 of FIG. 11). The VCN 1306 can include an LPG 1310 (e.g., the LPG 1110 of FIG. 11) that can be communicatively coupled to an SSH VCN 1312 (e.g., the SSH VCN 1112 of FIG. 11) via an LPG 1310 contained in the SSH VCN 1312. The SSH VCN 1312 can include an SSH subnet 1314 (e.g., the SSH subnet 1114 of FIG. 11), and the SSH VCN 1312 can be communicatively coupled to a control plane VCN 1316 (e.g., the control plane VCN 1116 of FIG. 11) via an LPG 1310 contained in the control plane VCN 1316 and to a data plane VCN 1318 (e.g., the data plane 1118 of FIG. 11) via an LPG 1310 contained in the data plane VCN 1318. The control plane VCN 1316 and the data plane VCN 1318 can be contained in a service tenancy 1319 (e.g., the service tenancy 1119 of FIG. 11).

The control plane VCN 1316 can include a control plane DMZ tier 1320 (e.g., the control plane DMZ tier 1120 of FIG. 11) that can include load balancer (LB) subnet(s) 1322 (e.g., LB subnet(s) 1122 of FIG. 11), a control plane app tier 1324 (e.g., the control plane app tier 1124 of FIG. 11) that can include app subnet(s) 1326 (e.g., similar to app subnet(s) 1126 of FIG. 11), a control plane data tier 1328 (e.g., the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 11) and a network address translation (NAT) gateway 1338 (e.g., the NAT gateway 1138 of FIG. 11). The control plane VCN 1316 can include the service gateway 1336 and the NAT gateway 1338.

The data plane VCN 1318 can include a data plane app tier 1346 (e.g., the data plane app tier 1146 of FIG. 11), a data plane DMZ tier 1348 (e.g., the data plane DMZ tier 1148 of FIG. 11), and a data plane data tier 1350 (e.g., the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective user tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g., public Internet 1154 of FIG. 11).

The Internet gateway 1334 contained in the control plane VCN 1316 and contained in the data plane VCN 1318 can be communicatively coupled to a metadata management service 1352 (e.g., the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with user tenancies 1370. This integration can be useful or desirable for users of the IaaS provider in some cases such as a case that may desire support when executing code. The user may provide code to run that may be destructive, may communicate with other user resources, or may otherwise cause undesirable effects. In response to this, the IaaS provider may determine whether to run code given to the IaaS provider by the user.

In some examples, the user of the IaaS provider may grant temporary network access to the IaaS provider and request a function to be attached to the data plane app tier 1346. Code to run the function may be executed in the VMs 1366(1)-(N), and the code may not be configured to run anywhere else on the data plane VCN 1318. Each VM 1366(1)-(N) may be connected to one user tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different user. The containers 1371(1)-(N) may be communicatively coupled to the user tenancy 1370 and may be configured to transmit or receive data from the user tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each user and that may run code from the user may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

FIG. 14 is a block diagram 1400 illustrating another example pattern of an IaaS architecture, according to at least one embodiment. Service operators 1402 (e.g., service operators 1102 of FIG. 11) can be communicatively coupled to a secure host tenancy 1404 (e.g., the secure host tenancy 1104 of FIG. 11) that can include a virtual cloud network (VCN) 1406 (e.g., the VCN 1106 of FIG. 11) and a secure host subnet 1408 (e.g., the secure host subnet 1108 of FIG. 11). The VCN 1406 can include an LPG 1410 (e.g., the LPG 1110 of FIG. 11) that can be communicatively coupled to an SSH VCN 1412 (e.g., the SSH VCN 1112 of FIG. 11) via an LPG 1410 contained in the SSH VCN 1412. The SSH VCN 1412 can include an SSH subnet 1414 (e.g., the SSH subnet 1114 of FIG. 11), and the SSH VCN 1412 can be communicatively coupled to a control plane VCN 1416 (e.g., the control plane VCN 1116 of FIG. 11) via an LPG 1410 contained in the control plane VCN 1416 and to a data plane VCN 1418 (e.g., the data plane 1118 of FIG. 11) via an LPG 1410 contained in the data plane VCN 1418. The control plane VCN 1416 and the data plane VCN 1418 can be contained in a service tenancy 1419 (e.g., the service tenancy 1119 of FIG. 11).

The control plane VCN 1416 can include a control plane DMZ tier 1420 (e.g., the control plane DMZ tier 1120 of FIG. 11) that can include LB subnet(s) 1422 (e.g., LB subnet(s) 1122 of FIG. 11), a control plane app tier 1424 (e.g., the control plane app tier 1124 of FIG. 11) that can include app subnet(s) 1426 (e.g., app subnet(s) 1126 of FIG. 11), a control plane data tier 1428 (e.g., the control plane data tier 1128 of FIG. 11) that can include DB subnet(s) 1430 (e.g., DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 11) and a network address translation (NAT) gateway 1438 (e.g., the NAT gateway 1138 of FIG. 11). The control plane VCN 1416 can include the service gateway 1436 and the NAT gateway 1438.

The data plane VCN 1418 can include a data plane app tier 1446 (e.g., the data plane app tier 1146 of FIG. 11), a data plane DMZ tier 1448 (e.g., the data plane DMZ tier 1148 of FIG. 11), and a data plane data tier 1450 (e.g., the data plane data tier 1150 of FIG. 11). The data plane DMZ tier 1448 can include LB subnet(s) 1422 that can be communicatively coupled to trusted app subnet(s) 1460 (e.g., trusted app subnet(s) 1360 of FIG. 13) and untrusted app subnet(s) 1462 (e.g., untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g., public Internet 1154 of FIG. 11).

The Internet gateway 1434 contained in the control plane VCN 1416 and contained in the data plane VCN 1418 can be communicatively coupled to a metadata management service 1452 (e.g., the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a user of the IaaS provider if the IaaS provider cannot directly communicate with the user (e.g., a disconnected region). The respective containers 1467(1)-(N) that are contained in the VMs 1466(1)-(N) for each user can be accessed in real-time by the user. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the user can be isolated from the control plane VCN 1416 and can be isolated from other entities contained in the data plane VCN 1418. The containers 1467(1)-(N) may also be isolated from resources from other users.

In other examples, the user can use the containers 1467(1)-(N) to call cloud services 1456. In this example, the user may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a user in a self-service, subscription-based, elastically scalable, reliable, highly available, and secure manner. An example of such an IaaS system is the Oracle Cloud Infrastructure (OCI) provided by the present assignee.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1504 provide the functionality described above. Storage subsystem 1518 may also provide a repository for storing data used in accordance with the present disclosure.

As depicted in the example in FIG. 15, storage subsystem 1518 can include various components including a system memory 1510, computer-readable storage media 1522, and a computer readable storage media reader 1520. System memory 1510 may store program instructions that are loadable and executable by processing unit 1504. System memory 1510 may also store data that is used during the execution of the instructions and/or data that is generated during the execution of the program instructions. Various different kinds of programs may be loaded into system memory 1510 including but not limited to client applications, Web browsers, mid-tier applications, relational database management systems (RDBMS), virtual machines, containers, etc.

System memory 1510 may also store an operating system 1516. Examples of operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1500 executes one or more virtual machines, the virtual machines along with their guest operating systems (GOSs) may be loaded into system memory 1510 and executed by one or more processors or cores of processing unit 1504.

System memory 1510 can come in different configurations depending upon the type of computer system 1500. For example, system memory 1510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1510 may include a basic input/output system (BIOS) containing basic routines that help to transfer information between elements within computer system 1500, such as during start-up.

Computer-readable storage media 1522 may represent remote, local, fixed, and/or removable storage devices plus storage media for temporarily and/or more permanently containing, storing, computer-readable information for use by computer system 1500 including instructions executable by processing unit 1504 of computer system 1500.

Computer-readable storage media 1522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Machine-readable instructions executable by one or more processors or cores of processing unit 1504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

creating a volume group comprising an initial snapshot of a virtual machine (VM) residing in an initial environment, the VM being in an initial configuration (VM1), wherein the VM is designated for replication in a cloud services provider infrastructure (CSPI);

generating a terraform stack based on the initial snapshot, wherein execution of the terraform stack in an environment causes replication of VM1 in that environment;

providing the terraform stack to a user;

generating a subsequent snapshot of the VM in a subsequent configuration (VM2);

generating a delta file characterizing a difference between the initial snapshot stored in the volume group and the subsequent snapshot;

generating a delta terraform stack based on the delta file, wherein execution of the delta terraform stack causes previously replicated VM1 to update to replicate VM2; and providing the delta terraform stack to the user, wherein the method further comprises replicating at least a portion of the volume group, the replicating comprising:

identifying the volume group, and replicating a boot volume from the volume group, wherein the generating the terraform stack further includes:

determining compatibility differences between the VM1 and the CSPI; and modifying the replicated boot volume such that replicated VM1 is compatible with the CSPI.

2. The method of claim 1, wherein the VM is not located in the CSPI.

3. The method of claim 1, wherein the initial environment is an on-premises environment.

4. The method of claim 1, wherein the initial environment VM is located in a cloud environment distinct from the CSPI.

5. The method of claim 1, further comprising executing the terraform stack in a user tenancy in the CSPI to replicate VM1.

6. The method of claim 5, further comprising executing the delta terraform stack in the user tenancy to replicate VM2.

7. The method of claim 6, wherein the subsequent snapshot is generated after replicating VM1.

8. The method of claim 7, further comprising:

generating additional subsequent snapshots; and generating a corresponding delta file for each of the subsequent snapshots.

9. The method of claim 1, wherein the modifying the boot volume such that the replicated VM1 is compatible with the CSPI comprises:

determining a first attribute of the initial environment;

determining a second attribute of the CSPI;

determining a difference between the first attribute and the second attribute; and modifying the boot volume to compensate for the difference between the first attribute and the second attribute.

10. The method of claim 9, wherein the first attribute characterizes hardware of the initial environment, and the second attribute characterizes hardware of a user tenancy in the CSPI.

11. The method of claim 1, wherein the terraform stack is modifiable by the user before executing the terraform stack.

12. The method of claim 1, further comprising provisioning a replication server from a migration control plane into a user tenancy in the CSPI, wherein the VM is subsequently replicated into the user tenancy.

13. The method of claim 12, wherein the initial environment includes a replication plugin.

14. The method of claim 13, wherein the creating the volume group further comprises:

generating the initial snapshot of the VM with the replication plugin; and storing the initial snapshot of the VM in an object storage.

15. The method of claim 14, further comprising:

writing, by the replication server, a copy of the initial snapshot of the VM into a block storage.

16. The method of claim 1, wherein the delta file comprises a single file that characterizes a difference between the initial snapshot of the VM and the subsequent snapshot of the VM.

17. The method of claim 1, wherein the delta file comprises a plurality of files, wherein the plurality of files together characterize a difference between the initial snapshot of the VM and the subsequent snapshot of the VM.

18. The method of claim 1, wherein the creating the volume group further comprises:

creating a data volume associated with the boot volume; and assigning an identifier to each of the boot volume and the data volume, wherein the identifier is included in the terraform stack.

19. A system comprising:

a memory comprising a volume database; and a processor configured to:

create a volume group comprising an initial snapshot of a virtual machine (VM) residing in an initial environment, the VM being in an initial configuration (VM1), wherein the VM is designated for replication in a cloud services provider infrastructure (CSPI);

generate a terraform stack based on the initial snapshot, wherein execution of the terraform stack in an environment causes replication of VM1 in that environment;

provide the terraform stack to a user;

generate a subsequent snapshot of the VM in a subsequent configuration (VM2);

generate a delta file characterizing a difference between the initial snapshot stored in the volume group and the subsequent snapshot;

generate a delta terraform stack based on the delta file, wherein execution of the delta terraform stack causes previously replicated VM1 to update to replicate VM2; and provide the delta terraform stack to the user, wherein the processor is further configured to replicate at least a portion of the volume group, by identifying the volume group, and replicating a boot volume from the volume group, and in generating the terraform stack, the processor is configured to determine compatibility differences between the VM1 and the CSPI and modify the replicated boot volume such that replicated VM1 is compatible with the CSPI.

20. A non-transitory computer-readable storage medium storing a plurality of instructions that, when executed by one or more processors, cause the one or more processors to:

create a volume group comprising an initial snapshot of a virtual machine (VM) residing in an initial environment, the VM being in an initial configuration (VM1), wherein the VM is designated for replication in a cloud services provider infrastructure (CSPI);

generate a terraform stack based on the initial snapshot, wherein execution of the terraform stack in an environment causes replication of VM1 in that environment;

provide the terraform stack to a user;

generate a subsequent snapshot of the VM in a subsequent configuration (VM2);

generate a delta file characterizing a difference between the initial snapshot stored in the volume group and the subsequent snapshot;

generate a delta terraform stack based on the delta file, wherein execution of the delta terraform stack causes previously replicated VM1 to update to replicate VM2; and provide the delta terraform stack to the user, wherein the plurality of instructions, when executed by the one or more processors, further cause the one or more processors to:

replicate at least a portion of the volume group, by identifying the volume group, and replicating a boot volume from the volume group, and generate the terraform stack by determining compatibility differences between the VM1 and the CSPI and modifying the replicated boot volume such that replicated VM1 is compatible with the CSPI.

* * * * *